United States Patent
Prakash et al.

(10) Patent No.: US 11,580,519 B2
(45) Date of Patent: Feb. 14, 2023

(54) PROVISIONING PLATFORM FOR MACHINE-TO-MACHINE DEVICES

(71) Applicant: Visa International Service Association, San Francisco, CA (US)

(72) Inventors: Gyan Prakash, Foster City, CA (US); Ajit Gaddam, Sunnyvale, CA (US); Selim Aissi, Menlo Park, CA (US)

(73) Assignee: Visa International Service Association, San Francisco, CA (US)

(*) Notice: Subject to any disclaimer, the term of this patent is extended or adjusted under 35 U.S.C. 154(b) by 1318 days.

(21) Appl. No.: 14/955,716

(22) Filed: Dec. 1, 2015

(65) Prior Publication Data
US 2016/0171479 A1    Jun. 16, 2016

Related U.S. Application Data

(60) Provisional application No. 62/091,097, filed on Dec. 12, 2014.

(51) Int. Cl.
*G06Q 20/32* (2012.01)
*H04L 9/40* (2022.01)
(Continued)

(52) U.S. Cl.
CPC ......... *G06Q 20/3226* (2013.01); *G01D 4/004* (2013.01); *G06F 21/44* (2013.01);
(Continued)

(58) Field of Classification Search
CPC ..................................................... H04W 4/70
See application file for complete search history.

(56) References Cited

U.S. PATENT DOCUMENTS

| 667,579 A | 2/1901 | Roemisch |
|---|---|---|
| 671,204 A | 4/1901 | Benson |

(Continued)

FOREIGN PATENT DOCUMENTS

| CN | 102088668 | 6/2011 |
|---|---|---|
| CN | 102971758 | 3/2013 |

(Continued)

OTHER PUBLICATIONS

AU2015361023, "First Examination Report", dated Mar. 29, 2019, 4 pages.
(Continued)

*Primary Examiner* — John W Hayes
*Assistant Examiner* — Zehra Raza
(74) *Attorney, Agent, or Firm* — Kilpatrick Townsend & Stockton LLP

(57) ABSTRACT

Techniques described herein include a platform and process for provisioning user information onto a machine-to-machine device in order to enable the machine-to-machine device to conduct transactions utilizing the user information. In some embodiments, a user device is used to relay information between a machine-to-machine device and a provisioning service provider computer. In some embodiments, a machine-to-machine device is connected to the provisioning service provider computer via a network connection. Upon receiving a request to provision the machine-to-machine device, the service provider computer may identify the device from a device identifier. The service provider computer may generate an access credential or token for the machine-to-machine device. The access credential, token, and/or one or more policies may be provisioned onto the machine-to-machine device.

7 Claims, 7 Drawing Sheets

(51) Int. Cl.
*H04W 4/70* (2018.01)
*G01D 4/00* (2006.01)
*G06F 21/44* (2013.01)
*H04W 8/26* (2009.01)
*H04W 8/00* (2009.01)

(52) U.S. Cl.
CPC ........ *H04L 63/0876* (2013.01); *H04L 63/102* (2013.01); *H04W 4/70* (2018.02); *F25D 2500/06* (2013.01); *H04W 8/005* (2013.01); *H04W 8/26* (2013.01); *Y02B 90/20* (2013.01); *Y04S 20/30* (2013.01)

(56) References Cited

U.S. PATENT DOCUMENTS

| | | |
|---|---|---|
| 5,613,012 A | 3/1997 | Hoffman et al. |
| 5,781,438 A | 7/1998 | Lee et al. |
| 5,883,810 A | 3/1999 | Franklin et al. |
| 5,953,710 A | 9/1999 | Fleming |
| 5,956,699 A | 9/1999 | Wong et al. |
| 6,000,832 A | 12/1999 | Franklin et al. |
| 6,014,635 A | 1/2000 | Harris et al. |
| 6,044,360 A | 3/2000 | Picciallo |
| 6,163,771 A | 12/2000 | Walker et al. |
| 6,227,447 B1 | 5/2001 | Campisano |
| 6,236,981 B1 | 5/2001 | Hill |
| 6,267,292 B1 | 7/2001 | Walker et al. |
| 6,327,578 B1 | 12/2001 | Linehan |
| 6,341,724 B2 | 1/2002 | Campisano |
| 6,385,596 B1 | 5/2002 | Wiser et al. |
| 6,422,462 B1 | 7/2002 | Cohen |
| 6,425,523 B1 | 7/2002 | Shem-Ur et al. |
| 6,592,044 B1 | 7/2003 | Wong et al. |
| 6,636,833 B1 | 10/2003 | Flitcroft et al. |
| 6,748,367 B1 | 6/2004 | Lee |
| 6,805,287 B2 | 10/2004 | Bishop et al. |
| 6,879,965 B2 | 4/2005 | Fung et al. |
| 6,891,953 B1 | 5/2005 | DeMello et al. |
| 6,901,387 B2 | 5/2005 | Wells et al. |
| 6,931,382 B2 | 8/2005 | Laage et al. |
| 6,938,019 B1 | 8/2005 | Uzo |
| 6,941,285 B2 | 9/2005 | Sarcanin |
| 6,980,670 B1 | 12/2005 | Hoffman et al. |
| 6,990,470 B2 | 1/2006 | Hogan et al. |
| 6,991,157 B2 | 1/2006 | Bishop et al. |
| 7,051,929 B2 | 5/2006 | Li |
| 7,069,249 B2 | 6/2006 | Stolfo et al. |
| 7,103,576 B2 | 9/2006 | Mann, III et al. |
| 7,113,930 B2 | 9/2006 | Eccles et al. |
| 7,136,835 B1 | 11/2006 | Flitcroft et al. |
| 7,177,835 B1 | 2/2007 | Walker et al. |
| 7,177,848 B2 | 2/2007 | Hogan et al. |
| 7,194,437 B1 | 3/2007 | Britto et al. |
| 7,209,561 B1 | 4/2007 | Shankar et al. |
| 7,264,154 B2 | 9/2007 | Harris |
| 7,287,692 B1 | 10/2007 | Patel et al. |
| 7,292,999 B2 | 11/2007 | Hobson et al. |
| 7,350,230 B2 | 3/2008 | Forrest |
| 7,353,382 B2 | 4/2008 | Labrou et al. |
| 7,379,919 B2 | 5/2008 | Hogan et al. |
| RE40,444 E | 7/2008 | Linehan |
| 7,415,443 B2 | 8/2008 | Hobson et al. |
| 7,444,676 B1 | 10/2008 | Asghari-Kamrani et al. |
| 7,469,151 B2 | 12/2008 | Khan et al. |
| 7,548,889 B2 | 6/2009 | Bhambri et al. |
| 7,567,934 B2 | 7/2009 | Flitcroft et al. |
| 7,567,936 B1 | 7/2009 | Peckover et al. |
| 7,571,139 B1 | 8/2009 | Giordano et al. |
| 7,571,142 B1 | 8/2009 | Flitcroft et al. |
| 7,580,898 B2 | 8/2009 | Brown et al. |
| 7,584,153 B2 | 9/2009 | Brown et al. |
| 7,593,896 B1 | 9/2009 | Flitcroft et al. |
| 7,606,560 B2 | 10/2009 | Labrou et al. |
| 7,627,531 B2 | 12/2009 | Breck et al. |
| 7,627,895 B2 | 12/2009 | Gifford et al. |
| 7,650,314 B1 | 1/2010 | Saunders |
| 7,685,037 B2 | 3/2010 | Reiners et al. |
| 7,702,578 B2 | 4/2010 | Fung et al. |
| 7,707,120 B2 | 4/2010 | Dominguez et al. |
| 7,712,655 B2 | 5/2010 | Wong |
| 7,734,527 B2 | 6/2010 | Uzo |
| 7,753,265 B2 | 7/2010 | Harris |
| 7,770,789 B2 | 8/2010 | Oder, II et al. |
| 7,784,685 B1 | 8/2010 | Hopkins, III |
| 7,793,851 B2 | 9/2010 | Mullen |
| 7,801,826 B2 | 9/2010 | Labrou et al. |
| 7,805,376 B2 | 9/2010 | Smith |
| 7,805,378 B2 | 9/2010 | Berardi et al. |
| 7,818,264 B2 | 10/2010 | Hammad |
| 7,828,220 B2 | 11/2010 | Mullen |
| 7,835,960 B2 | 11/2010 | Breck et al. |
| 7,841,523 B2 | 11/2010 | Oder, II et al. |
| 7,841,539 B2 | 11/2010 | Hewton |
| 7,844,550 B2 | 11/2010 | Walker et al. |
| 7,848,980 B2 | 12/2010 | Carlson |
| 7,849,020 B2 | 12/2010 | Johnson |
| 7,853,529 B1 | 12/2010 | Walker et al. |
| 7,853,995 B2 | 12/2010 | Chow et al. |
| 7,865,414 B2 | 1/2011 | Fung et al. |
| 7,873,579 B2 | 1/2011 | Hobson et al. |
| 7,873,580 B2 | 1/2011 | Hobson et al. |
| 7,890,393 B2 | 2/2011 | Talbert et al. |
| 7,891,563 B2 | 2/2011 | Oder, II et al. |
| 7,896,238 B2 | 3/2011 | Fein et al. |
| 7,908,216 B1 | 3/2011 | Davis et al. |
| 7,922,082 B2 | 4/2011 | Muscato |
| 7,931,195 B2 | 4/2011 | Mullen |
| 7,937,324 B2 | 5/2011 | Patterson |
| 7,938,318 B2 | 5/2011 | Fein et al. |
| 7,954,705 B2 | 6/2011 | Mullen |
| 7,959,076 B1 | 6/2011 | Hopkins, III |
| 7,996,288 B1 | 8/2011 | Stolfo |
| 8,025,223 B2 | 9/2011 | Saunders et al. |
| 8,046,256 B2 | 10/2011 | Chien et al. |
| 8,051,464 B2 | 11/2011 | Cheeniyil |
| 8,060,448 B2 | 11/2011 | Jones |
| 8,060,449 B2 | 11/2011 | Zhu |
| 8,074,877 B2 | 12/2011 | Mullen et al. |
| 8,074,879 B2 | 12/2011 | Harris |
| 8,082,210 B2 | 12/2011 | Hansen |
| 8,095,113 B2 | 1/2012 | Kean et al. |
| 8,104,679 B2 | 1/2012 | Brown |
| RE43,157 E | 2/2012 | Bishop et al. |
| 8,109,436 B1 | 2/2012 | Hopkins, III |
| 8,121,942 B2 | 2/2012 | Carlson et al. |
| 8,121,956 B2 | 2/2012 | Carlson et al. |
| 8,126,449 B2 | 2/2012 | Beenau et al. |
| 8,171,525 B1 | 5/2012 | Pelly et al. |
| 8,175,973 B2 | 5/2012 | Davis et al. |
| 8,190,523 B2 | 5/2012 | Patterson |
| 8,196,813 B2 | 6/2012 | Vadhri |
| 8,205,791 B2 | 6/2012 | Randazza et al. |
| 8,219,489 B2 | 7/2012 | Patterson |
| 8,224,702 B2 | 7/2012 | Mengerink et al. |
| 8,225,385 B2 | 7/2012 | Chow et al. |
| 8,229,852 B2 | 7/2012 | Carlson |
| 8,265,993 B2 | 9/2012 | Chien et al. |
| 8,280,777 B2 | 10/2012 | Mengerink et al. |
| 8,281,991 B2 | 10/2012 | Wentker et al. |
| 8,328,095 B2 | 12/2012 | Oder, II et al. |
| 8,336,088 B2 | 12/2012 | Raj et al. |
| 8,346,666 B2 | 1/2013 | Lindelsee et al. |
| 8,376,225 B1 | 2/2013 | Hopkins, III |
| 8,380,177 B2 | 2/2013 | Laracey |
| 8,387,873 B2 | 3/2013 | Saunders et al. |
| 8,401,539 B2 | 3/2013 | Beenau et al. |
| 8,401,898 B2 | 3/2013 | Chien et al. |
| 8,402,555 B2 | 3/2013 | Grecia |
| 8,403,211 B2 | 3/2013 | Brooks et al. |
| 8,412,623 B2 | 4/2013 | Moon et al. |
| 8,412,837 B1 | 4/2013 | Emigh et al. |
| 8,417,642 B2 | 4/2013 | Oren et al. |
| 8,447,699 B2 | 5/2013 | Batada et al. |

(56) References Cited

U.S. PATENT DOCUMENTS

| | | |
|---|---|---|
| 8,453,223 B2 | 5/2013 | Svigals et al. |
| 8,453,925 B2 | 6/2013 | Fisher et al. |
| 8,458,487 B1 | 6/2013 | Palgon et al. |
| 8,484,134 B2 | 7/2013 | Hobson et al. |
| 8,485,437 B2 | 7/2013 | Mullen et al. |
| 8,494,959 B2 | 7/2013 | Hathaway et al. |
| 8,498,908 B2 | 7/2013 | Mengerink et al. |
| 8,504,475 B2 | 8/2013 | Brand et al. |
| 8,504,478 B2 | 8/2013 | Saunders et al. |
| 8,510,816 B2 | 8/2013 | Quach et al. |
| 8,433,116 B2 | 9/2013 | Davis et al. |
| 8,533,860 B1 | 9/2013 | Grecia |
| 8,538,845 B2 | 9/2013 | Liberty |
| 8,555,079 B2 | 10/2013 | Shablygin et al. |
| 8,566,168 B1 | 10/2013 | Bierbaum et al. |
| 8,567,670 B2 | 10/2013 | Stanfield et al. |
| 8,571,939 B2 | 10/2013 | Lindsey et al. |
| 8,577,336 B2 | 11/2013 | Mechaley, Jr. |
| 8,577,803 B2 | 11/2013 | Chatterjee et al. |
| 8,577,813 B2 | 11/2013 | Weiss |
| 8,578,176 B2 | 11/2013 | Mattsson |
| 8,583,494 B2 | 11/2013 | Fisher |
| 8,584,251 B2 | 11/2013 | Mcguire et al. |
| 8,589,237 B2 | 11/2013 | Fisher |
| 8,589,271 B2 | 11/2013 | Evans |
| 8,589,291 B2 | 11/2013 | Carlson et al. |
| 8,595,098 B2 | 11/2013 | Starai et al. |
| 8,595,812 B2 | 11/2013 | Bomar et al. |
| 8,595,850 B2 | 11/2013 | Spies et al. |
| 8,606,638 B2 | 12/2013 | Dragt |
| 8,606,700 B2 | 12/2013 | Carlson et al. |
| 8,606,720 B1 | 12/2013 | Baker et al. |
| 8,615,468 B2 | 12/2013 | Varadarajan |
| 8,620,754 B2 | 12/2013 | Fisher |
| 8,635,157 B2 | 1/2014 | Smith et al. |
| 8,646,059 B1 | 2/2014 | Von Behren et al. |
| 8,651,374 B2 | 2/2014 | Brabson et al. |
| 8,656,180 B2 | 2/2014 | Shablygin et al. |
| 8,667,579 B2 | 3/2014 | Leeder |
| 8,671,204 B2 | 3/2014 | Srinivasan |
| 8,683,226 B2 | 3/2014 | Popp |
| 8,751,391 B2 | 6/2014 | Freund |
| 8,762,263 B2 | 6/2014 | Gauthier et al. |
| 8,793,186 B2 | 7/2014 | Patterson |
| 8,838,982 B2 | 9/2014 | Carlson et al. |
| 8,856,539 B2 | 10/2014 | Weiss |
| 8,887,308 B2 | 11/2014 | Grecia |
| 9,065,643 B2 | 6/2015 | Hurry et al. |
| 9,070,129 B2 | 6/2015 | Sheets et al. |
| 9,100,826 B2 | 8/2015 | Weiss |
| 9,160,741 B2 | 10/2015 | Wentker et al. |
| 9,229,964 B2 | 1/2016 | Stevelinck |
| 9,245,267 B2 | 1/2016 | Singh |
| 9,249,241 B2 | 2/2016 | Dai et al. |
| 9,256,871 B2 | 2/2016 | Anderson et al. |
| 9,280,765 B2 | 3/2016 | Hammad |
| 9,530,137 B2 | 12/2016 | Weiss |
| 2001/0029485 A1 | 10/2001 | Brody et al. |
| 2001/0034720 A1 | 10/2001 | Armes |
| 2001/0054003 A1 | 12/2001 | Chien et al. |
| 2002/0007320 A1 | 1/2002 | Hogan et al. |
| 2002/0016749 A1 | 2/2002 | Borecki et al. |
| 2002/0029193 A1 | 3/2002 | Ranjan et al. |
| 2002/0035548 A1 | 3/2002 | Hogan et al. |
| 2002/0073045 A1 | 6/2002 | Rubin et al. |
| 2002/0116341 A1 | 8/2002 | Hogan et al. |
| 2002/0133467 A1 | 9/2002 | Hobson et al. |
| 2002/0147913 A1 | 10/2002 | Lun Yip |
| 2003/0028481 A1 | 2/2003 | Flitcroft et al. |
| 2003/0130955 A1 | 7/2003 | Hawthorne |
| 2003/0191709 A1 | 10/2003 | Elston et al. |
| 2003/0191945 A1 | 10/2003 | Keech |
| 2004/0010462 A1 | 1/2004 | Moon et al. |
| 2004/0050928 A1 | 3/2004 | Bishop et al. |
| 2004/0059682 A1 | 3/2004 | Hasumi et al. |
| 2004/0093281 A1 | 5/2004 | Silverstein et al. |
| 2004/0139008 A1 | 7/2004 | Mascavage, III |
| 2004/0143532 A1 | 7/2004 | Lee |
| 2004/0158532 A1 | 8/2004 | Breck et al. |
| 2004/0210449 A1 | 10/2004 | Breck et al. |
| 2004/0210498 A1 | 10/2004 | Freund |
| 2004/0232225 A1 | 11/2004 | Bishop et al. |
| 2004/0260646 A1 | 12/2004 | Berardi et al. |
| 2005/0037735 A1 | 2/2005 | Coutts |
| 2005/0080730 A1 | 4/2005 | Sorrentino |
| 2005/0108178 A1 | 5/2005 | York |
| 2005/0199709 A1 | 9/2005 | Linlor |
| 2005/0246293 A1 | 11/2005 | Ong |
| 2005/0269401 A1 | 12/2005 | Spitzer et al. |
| 2005/0269402 A1 | 12/2005 | Spitzer et al. |
| 2006/0235795 A1 | 10/2006 | Johnson et al. |
| 2006/0237528 A1 | 10/2006 | Bishop et al. |
| 2006/0278704 A1 | 12/2006 | Saunders et al. |
| 2007/0107044 A1 | 5/2007 | Yuen et al. |
| 2007/0129955 A1 | 6/2007 | Dalmia et al. |
| 2007/0136193 A1 | 6/2007 | Starr |
| 2007/0136211 A1 | 6/2007 | Brown et al. |
| 2007/0170247 A1 | 7/2007 | Friedman |
| 2007/0179885 A1 | 8/2007 | Bird et al. |
| 2007/0208671 A1 | 9/2007 | Brown et al. |
| 2007/0245414 A1 | 10/2007 | Chan et al. |
| 2007/0288377 A1 | 12/2007 | Shaked |
| 2007/0291995 A1 | 12/2007 | Rivera |
| 2008/0015988 A1 | 1/2008 | Brown et al. |
| 2008/0029607 A1 | 2/2008 | Mullen |
| 2008/0035738 A1 | 2/2008 | Mullen |
| 2008/0052226 A1 | 2/2008 | Agarwal et al. |
| 2008/0054068 A1 | 3/2008 | Mullen |
| 2008/0054079 A1 | 3/2008 | Mullen |
| 2008/0054081 A1 | 3/2008 | Mullen |
| 2008/0065554 A1 | 3/2008 | Hogan et al. |
| 2008/0065555 A1 | 3/2008 | Mullen |
| 2008/0201264 A1 | 8/2008 | Brown et al. |
| 2008/0201265 A1 | 8/2008 | Hewton |
| 2008/0228646 A1 | 9/2008 | Myers et al. |
| 2008/0243702 A1 | 10/2008 | Hart et al. |
| 2008/0245855 A1 | 10/2008 | Fein et al. |
| 2008/0245861 A1 | 10/2008 | Fein et al. |
| 2008/0283591 A1 | 11/2008 | Oder, II et al. |
| 2008/0302869 A1 | 12/2008 | Mullen |
| 2008/0302876 A1 | 12/2008 | Mullen |
| 2008/0313264 A1 | 12/2008 | Pestoni |
| 2009/0006262 A1 | 1/2009 | Brown et al. |
| 2009/0010488 A1 | 1/2009 | Matsuoka et al. |
| 2009/0037333 A1 | 2/2009 | Flitcroft et al. |
| 2009/0037388 A1 | 2/2009 | Cooper et al. |
| 2009/0043702 A1 | 2/2009 | Bennett |
| 2009/0048971 A1 | 2/2009 | Hathaway et al. |
| 2009/0106112 A1 | 4/2009 | Dalmia et al. |
| 2009/0106160 A1 | 4/2009 | Skowronek |
| 2009/0134217 A1 | 5/2009 | Flitcroft et al. |
| 2009/0157555 A1 | 6/2009 | Biffle et al. |
| 2009/0159673 A1 | 6/2009 | Mullen et al. |
| 2009/0159700 A1 | 6/2009 | Mullen et al. |
| 2009/0159707 A1 | 6/2009 | Mullen et al. |
| 2009/0173782 A1 | 7/2009 | Muscato |
| 2009/0200371 A1 | 8/2009 | Kean et al. |
| 2009/0248583 A1 | 10/2009 | Chhabra |
| 2009/0276347 A1 | 11/2009 | Kargman |
| 2009/0281948 A1 | 11/2009 | Carlson |
| 2009/0294527 A1 | 12/2009 | Brabson et al. |
| 2009/0307139 A1 | 12/2009 | Mardikar et al. |
| 2009/0308921 A1 | 12/2009 | Mullen |
| 2009/0327131 A1 | 12/2009 | Beenau et al. |
| 2010/0008535 A1 | 1/2010 | Abulafia et al. |
| 2010/0088237 A1 | 4/2010 | Wankmueller |
| 2010/0094755 A1 | 4/2010 | Kloster |
| 2010/0106644 A1 | 4/2010 | Annan et al. |
| 2010/0120408 A1 | 5/2010 | Beenau et al. |
| 2010/0133334 A1 | 6/2010 | Vadhri |
| 2010/0138347 A1 | 6/2010 | Chen |
| 2010/0145860 A1 | 6/2010 | Pelegero |
| 2010/0161433 A1 | 6/2010 | White |
| 2010/0185545 A1 | 7/2010 | Royyuru et al. |

(56) References Cited

U.S. PATENT DOCUMENTS

| | | |
|---|---|---|
| 2010/0211505 A1 | 8/2010 | Saunders et al. |
| 2010/0223186 A1 | 9/2010 | Hogan et al. |
| 2010/0228668 A1 | 9/2010 | Hogan et al. |
| 2010/0235284 A1 | 9/2010 | Moore |
| 2010/0258620 A1 | 10/2010 | Torreyson et al. |
| 2010/0291904 A1 | 11/2010 | Musfeldt et al. |
| 2010/0299267 A1 | 11/2010 | Faith et al. |
| 2010/0306076 A1 | 12/2010 | Taveau et al. |
| 2010/0325041 A1 | 12/2010 | Berardi et al. |
| 2011/0010292 A1 | 1/2011 | Giordano et al. |
| 2011/0016047 A1 | 1/2011 | Wu et al. |
| 2011/0016320 A1 | 1/2011 | Bergsten et al. |
| 2011/0040640 A1 | 2/2011 | Erikson |
| 2011/0047076 A1 | 2/2011 | Carlson et al. |
| 2011/0083018 A1 | 4/2011 | Kesanupalli et al. |
| 2011/0087596 A1 | 4/2011 | Dorsey |
| 2011/0093397 A1 | 4/2011 | Carlson et al. |
| 2011/0125597 A1 | 5/2011 | Oder, II et al. |
| 2011/0153437 A1 | 6/2011 | Archer et al. |
| 2011/0153498 A1 | 6/2011 | Makhotin et al. |
| 2011/0154466 A1 | 6/2011 | Harper et al. |
| 2011/0161233 A1 | 6/2011 | Tieken |
| 2011/0178926 A1 | 7/2011 | Lindelsee et al. |
| 2011/0191244 A1 | 8/2011 | Dai |
| 2011/0238511 A1 | 9/2011 | Park et al. |
| 2011/0238573 A1 | 9/2011 | Varadarajan |
| 2011/0246317 A1 | 10/2011 | Coppinger |
| 2011/0258111 A1 | 10/2011 | Raj et al. |
| 2011/0272471 A1 | 11/2011 | Mullen |
| 2011/0272478 A1 | 11/2011 | Mullen |
| 2011/0276380 A1 | 11/2011 | Mullen et al. |
| 2011/0276381 A1 | 11/2011 | Mullen et al. |
| 2011/0276424 A1 | 11/2011 | Mullen |
| 2011/0276425 A1 | 11/2011 | Mullen |
| 2011/0295745 A1 | 12/2011 | White et al. |
| 2011/0302081 A1 | 12/2011 | Saunders et al. |
| 2012/0023567 A1 | 1/2012 | Hammad |
| 2012/0028609 A1 | 2/2012 | Hruska |
| 2012/0030047 A1 | 2/2012 | Fuentes et al. |
| 2012/0035998 A1 | 2/2012 | Chien et al. |
| 2012/0041881 A1 | 2/2012 | Basu et al. |
| 2012/0047237 A1 | 2/2012 | Arvidsson et al. |
| 2012/0066078 A1 | 3/2012 | Kingston et al. |
| 2012/0072350 A1 | 3/2012 | Goldthwaite et al. |
| 2012/0078735 A1 | 3/2012 | Bauer et al. |
| 2012/0078798 A1 | 3/2012 | Downing et al. |
| 2012/0078799 A1 | 3/2012 | Jackson et al. |
| 2012/0095852 A1 | 4/2012 | Bauer et al. |
| 2012/0095865 A1 | 4/2012 | Doherty et al. |
| 2012/0116902 A1 | 5/2012 | Cardina et al. |
| 2012/0123882 A1 | 5/2012 | Carlson et al. |
| 2012/0123940 A1 | 5/2012 | Killian et al. |
| 2012/0129514 A1 | 5/2012 | Beenau et al. |
| 2012/0143767 A1 | 6/2012 | Abadir |
| 2012/0143772 A1 | 6/2012 | Abadir |
| 2012/0158580 A1 | 6/2012 | Eram et al. |
| 2012/0158593 A1 | 6/2012 | Garfinkle et al. |
| 2012/0172026 A1* | 7/2012 | Kwon .................. H04L 63/067 455/419 |
| 2012/0173431 A1 | 7/2012 | Ritchie et al. |
| 2012/0185386 A1 | 7/2012 | Salama et al. |
| 2012/0197807 A1 | 8/2012 | Schlesser et al. |
| 2012/0203664 A1 | 8/2012 | Torossian et al. |
| 2012/0203666 A1 | 8/2012 | Torossian et al. |
| 2012/0215688 A1 | 8/2012 | Musser et al. |
| 2012/0215696 A1 | 8/2012 | Salonen |
| 2012/0221421 A1 | 8/2012 | Hammad |
| 2012/0226582 A1 | 9/2012 | Hammad |
| 2012/0231844 A1 | 9/2012 | Coppinger |
| 2012/0233004 A1 | 9/2012 | Bercaw |
| 2012/0246070 A1 | 9/2012 | Vadhri |
| 2012/0246071 A1 | 9/2012 | Jain et al. |
| 2012/0246079 A1 | 9/2012 | Wilson et al. |
| 2012/0265631 A1 | 10/2012 | Cronic et al. |
| 2012/0270524 A1* | 10/2012 | Venkataramu ...... H04L 63/0853 455/411 |
| 2012/0271770 A1 | 10/2012 | Harris et al. |
| 2012/0284777 A1 | 11/2012 | Eugenio |
| 2012/0297446 A1 | 11/2012 | Webb et al. |
| 2012/0300932 A1 | 11/2012 | Cambridge et al. |
| 2012/0303503 A1 | 11/2012 | Cambridge et al. |
| 2012/0303961 A1 | 11/2012 | Kean et al. |
| 2012/0304273 A1 | 11/2012 | Bailey et al. |
| 2012/0310725 A1 | 12/2012 | Chien et al. |
| 2012/0310831 A1 | 12/2012 | Harris et al. |
| 2012/0316992 A1 | 12/2012 | Oborne |
| 2012/0317035 A1 | 12/2012 | Royyuru et al. |
| 2012/0317036 A1 | 12/2012 | Bower et al. |
| 2013/0017784 A1 | 1/2013 | Fisher |
| 2013/0018757 A1 | 1/2013 | Anderson et al. |
| 2013/0019098 A1 | 1/2013 | Gupta et al. |
| 2013/0031006 A1 | 1/2013 | Mccullagh et al. |
| 2013/0041997 A1 | 2/2013 | Li |
| 2013/0054337 A1 | 2/2013 | Brendell et al. |
| 2013/0054466 A1 | 2/2013 | Muscato |
| 2013/0054474 A1 | 2/2013 | Yeager |
| 2013/0081122 A1 | 3/2013 | Svigals et al. |
| 2013/0091028 A1 | 4/2013 | Oder ("J.D."), II et al. |
| 2013/0110658 A1 | 5/2013 | Lyman et al. |
| 2013/0111599 A1 | 5/2013 | Gargiulo |
| 2013/0117185 A1 | 5/2013 | Collison et al. |
| 2013/0124290 A1 | 5/2013 | Fisher |
| 2013/0124291 A1 | 5/2013 | Fisher |
| 2013/0124364 A1 | 5/2013 | Mittal |
| 2013/0138525 A1 | 5/2013 | Bercaw |
| 2013/0144888 A1 | 6/2013 | Faith et al. |
| 2013/0145148 A1 | 6/2013 | Shablygin et al. |
| 2013/0145172 A1 | 6/2013 | Shablygin et al. |
| 2013/0159178 A1 | 6/2013 | Colon et al. |
| 2013/0159184 A1 | 6/2013 | Thaw |
| 2013/0166402 A1 | 6/2013 | Parento et al. |
| 2013/0166456 A1 | 6/2013 | Zhang et al. |
| 2013/0173736 A1 | 7/2013 | Krzeminski et al. |
| 2013/0185202 A1 | 7/2013 | Goldthwaite et al. |
| 2013/0191286 A1 | 7/2013 | Cronic et al. |
| 2013/0191289 A1 | 7/2013 | Cronic et al. |
| 2013/0198071 A1 | 8/2013 | Jurss |
| 2013/0198080 A1 | 8/2013 | Anderson et al. |
| 2013/0200146 A1 | 8/2013 | Moghadam |
| 2013/0204787 A1 | 8/2013 | Dubois |
| 2013/0204793 A1 | 8/2013 | Kerridge et al. |
| 2013/0212007 A1 | 8/2013 | Mattsson et al. |
| 2013/0212017 A1 | 8/2013 | Bangia |
| 2013/0212019 A1 | 8/2013 | Mattsson et al. |
| 2013/0212024 A1 | 8/2013 | Mattsson et al. |
| 2013/0212026 A1 | 8/2013 | Powell et al. |
| 2013/0212666 A1 | 8/2013 | Mattsson et al. |
| 2013/0218698 A1 | 8/2013 | Moon et al. |
| 2013/0218769 A1 | 8/2013 | Pourfallah et al. |
| 2013/0226799 A1 | 8/2013 | Raj |
| 2013/0226813 A1 | 8/2013 | Voltz |
| 2013/0246199 A1 | 9/2013 | Carlson |
| 2013/0246202 A1 | 9/2013 | Tobin |
| 2013/0246203 A1 | 9/2013 | Laracey |
| 2013/0246258 A1 | 9/2013 | Dessert |
| 2013/0246259 A1 | 9/2013 | Dessert |
| 2013/0246261 A1 | 9/2013 | Purves et al. |
| 2013/0246267 A1 | 9/2013 | Tobin |
| 2013/0254028 A1 | 9/2013 | Salci |
| 2013/0254052 A1 | 9/2013 | Royyuru et al. |
| 2013/0254102 A1 | 9/2013 | Royyuru |
| 2013/0254117 A1 | 9/2013 | Von Mueller et al. |
| 2013/0262296 A1 | 10/2013 | Thomas et al. |
| 2013/0262302 A1 | 10/2013 | Lettow et al. |
| 2013/0262315 A1 | 10/2013 | Hruska |
| 2013/0262316 A1 | 10/2013 | Hruska |
| 2013/0262317 A1 | 10/2013 | Collinge et al. |
| 2013/0275300 A1 | 10/2013 | Killian et al. |
| 2013/0275307 A1 | 10/2013 | Khan |
| 2013/0275308 A1 | 10/2013 | Paraskeva et al. |
| 2013/0282502 A1 | 10/2013 | Jooste |
| 2013/0282575 A1 | 10/2013 | Mullen et al. |
| 2013/0282588 A1 | 10/2013 | Hruska |

(56) References Cited

U.S. PATENT DOCUMENTS

| | | |
|---|---|---|
| 2013/0297501 A1 | 11/2013 | Monk et al. |
| 2013/0297504 A1 | 11/2013 | Nwokolo et al. |
| 2013/0297508 A1 | 11/2013 | Belamant |
| 2013/0304649 A1 | 11/2013 | Cronic et al. |
| 2013/0308778 A1 | 11/2013 | Fosmark et al. |
| 2013/0311382 A1 | 11/2013 | Fosmark et al. |
| 2013/0317982 A1 | 11/2013 | Mengerink et al. |
| 2013/0332344 A1 | 12/2013 | Weber |
| 2013/0339253 A1 | 12/2013 | Sincai |
| 2013/0346314 A1 | 12/2013 | Mogollon et al. |
| 2014/0007213 A1 | 1/2014 | Sanin et al. |
| 2014/0013106 A1 | 1/2014 | Redpath |
| 2014/0013114 A1 | 1/2014 | Redpath |
| 2014/0013452 A1 | 1/2014 | Aissi et al. |
| 2014/0019352 A1 | 1/2014 | Shrivastava |
| 2014/0025581 A1 | 1/2014 | Calman |
| 2014/0025585 A1 | 1/2014 | Calman |
| 2014/0025958 A1 | 1/2014 | Calman |
| 2014/0032417 A1 | 1/2014 | Mattsson |
| 2014/0032418 A1 | 1/2014 | Weber |
| 2014/0040137 A1 | 2/2014 | Carlson et al. |
| 2014/0040139 A1 | 2/2014 | Brudnicki et al. |
| 2014/0040144 A1 | 2/2014 | Plomske et al. |
| 2014/0040145 A1 | 2/2014 | Ozvat et al. |
| 2014/0040148 A1 | 2/2014 | Ozvat et al. |
| 2014/0040628 A1 | 2/2014 | Fort et al. |
| 2014/0041018 A1 | 2/2014 | Bomar et al. |
| 2014/0046848 A1 | 2/2014 | Radu et al. |
| 2014/0046853 A1 | 2/2014 | Spies et al. |
| 2014/0047551 A1 | 2/2014 | Nagasundaram et al. |
| 2014/0052532 A1 | 2/2014 | Tsai et al. |
| 2014/0052620 A1 | 2/2014 | Rogers et al. |
| 2014/0052637 A1 | 2/2014 | Jooste et al. |
| 2014/0068706 A1 | 3/2014 | Aissi |
| 2014/0074637 A1 | 3/2014 | Hammad |
| 2014/0108172 A1 | 4/2014 | Weber et al. |
| 2014/0114857 A1 | 4/2014 | Griggs et al. |
| 2014/0143137 A1 | 5/2014 | Carlson |
| 2014/0164243 A1 | 6/2014 | Aabye et al. |
| 2014/0188586 A1 | 7/2014 | Carpenter et al. |
| 2014/0195807 A1 | 7/2014 | Bar-El et al. |
| 2014/0294701 A1 | 10/2014 | Dai et al. |
| 2014/0297438 A1* | 10/2014 | Dua .............. G06Q 20/20 705/21 |
| 2014/0297534 A1 | 10/2014 | Patterson |
| 2014/0310183 A1 | 10/2014 | Weber |
| 2014/0313882 A1 | 10/2014 | Rucker et al. |
| 2014/0330721 A1 | 11/2014 | Wang |
| 2014/0330722 A1 | 11/2014 | Laxminarayanan et al. |
| 2014/0331265 A1 | 11/2014 | Mozell et al. |
| 2014/0337236 A1 | 11/2014 | Wong et al. |
| 2014/0344153 A1 | 11/2014 | Raj et al. |
| 2014/0351099 A1 | 11/2014 | Zhu |
| 2014/0372308 A1 | 12/2014 | Sheets |
| 2015/0019443 A1 | 1/2015 | Sheets et al. |
| 2015/0032625 A1 | 1/2015 | Dill et al. |
| 2015/0032626 A1 | 1/2015 | Dill et al. |
| 2015/0032627 A1 | 1/2015 | Dill et al. |
| 2015/0046338 A1 | 2/2015 | Laxminarayanan et al. |
| 2015/0046339 A1 | 2/2015 | Wong et al. |
| 2015/0052064 A1 | 2/2015 | Karpenko et al. |
| 2015/0088756 A1 | 3/2015 | Makhotin et al. |
| 2015/0106239 A1 | 4/2015 | Gaddam et al. |
| 2015/0112870 A1 | 4/2015 | Nagasundaram et al. |
| 2015/0112871 A1 | 4/2015 | Kumnick |
| 2015/0120472 A1 | 4/2015 | Aabye et al. |
| 2015/0127529 A1 | 5/2015 | Makhotin et al. |
| 2015/0127547 A1 | 5/2015 | Powell et al. |
| 2015/0140960 A1 | 5/2015 | Powell et al. |
| 2015/0142673 A1 | 5/2015 | Nelsen et al. |
| 2015/0161597 A1 | 6/2015 | Subramanian et al. |
| 2015/0178724 A1 | 6/2015 | Ngo et al. |
| 2015/0180836 A1 | 6/2015 | Wong et al. |
| 2015/0186864 A1 | 7/2015 | Jones et al. |
| 2015/0193222 A1 | 7/2015 | Pirzadeh et al. |
| 2015/0195133 A1 | 7/2015 | Sheets et al. |
| 2015/0199679 A1 | 7/2015 | Palanisamy et al. |
| 2015/0199689 A1 | 7/2015 | Kumnick et al. |
| 2015/0220917 A1 | 8/2015 | Aabye et al. |
| 2015/0269566 A1 | 9/2015 | Gaddam et al. |
| 2015/0312038 A1 | 10/2015 | Palanisamy |
| 2015/0319158 A1 | 11/2015 | Kumnick |
| 2015/0332262 A1 | 11/2015 | Lingappa |
| 2015/0356560 A1 | 12/2015 | Shastry et al. |
| 2016/0028550 A1 | 1/2016 | Gaddam et al. |
| 2016/0042263 A1 | 2/2016 | Gaddam et al. |
| 2016/0065370 A1 | 3/2016 | Le Saint et al. |
| 2016/0092696 A1 | 3/2016 | Guglani et al. |
| 2016/0092872 A1 | 3/2016 | Prakash et al. |
| 2016/0103675 A1 | 4/2016 | Aabye et al. |
| 2016/0119296 A1 | 4/2016 | Laxminarayanan et al. |
| 2016/0140545 A1 | 5/2016 | Flurscheim et al. |
| 2016/0148197 A1 | 5/2016 | Dimmick |
| 2016/0148212 A1 | 5/2016 | Dimmick |
| 2016/0173483 A1 | 6/2016 | Wong et al. |
| 2016/0210628 A1 | 7/2016 | Mcguire |
| 2016/0218875 A1 | 7/2016 | Le Saint et al. |
| 2016/0224976 A1 | 8/2016 | Basu |
| 2017/0046696 A1 | 2/2017 | Powell et al. |
| 2017/0103271 A1 | 4/2017 | Weber |
| 2017/0201850 A1* | 7/2017 | Raleigh .............. G06F 3/0482 |
| 2017/0220818 A1 | 8/2017 | Nagasundaram et al. |
| 2017/0228723 A1 | 8/2017 | Taylor |

FOREIGN PATENT DOCUMENTS

| | | |
|---|---|---|
| CN | 103501228 | 1/2014 |
| CN | 103782611 | 5/2014 |
| CN | 103903154 | 7/2014 |
| CN | 204576597 | 8/2015 |
| EP | 2156397 A1 | 2/2010 |
| EP | 2360871 | 8/2011 |
| JP | 2004120233 | 4/2004 |
| JP | 2004326147 | 11/2004 |
| JP | 2007257355 | 10/2007 |
| JP | 2013015992 | 1/2013 |
| JP | 2014232433 | 12/2014 |
| RU | 2354066 | 4/2009 |
| RU | 2502127 | 12/2013 |
| SG | 11201703526 | 3/2019 |
| WO | 2001035304 A1 | 5/2001 |
| WO | 2001035304 A9 | 5/2001 |
| WO | 2004042536 A2 | 5/2004 |
| WO | 2006113834 A2 | 10/2006 |
| WO | 2009032523 A1 | 3/2009 |
| WO | 2010078522 A1 | 7/2010 |
| WO | 2012068078 A2 | 5/2012 |
| WO | 2012098556 A1 | 7/2012 |
| WO | 2012136005 | 10/2012 |
| WO | 2012142370 A2 | 10/2012 |
| WO | 2012167941 A1 | 12/2012 |
| WO | 2013048538 A1 | 4/2013 |
| WO | 2013056104 A1 | 4/2013 |
| WO | 2013119914 A1 | 8/2013 |
| WO | 2013179271 A2 | 12/2013 |
| WO | 2016094122 A1 | 6/2016 |

OTHER PUBLICATIONS

PCT International Search Report and Written Opinion in re Application No. PCT/US2015/063147, dated Apr. 7, 2016, 13 pages.
EP15868000.9 , "Office Action", dated Feb. 13, 2019, 4 pages.
EP15868000.9 , "Extended European Search Report", dated Apr. 10, 2018, 12 pages.
EP15868000.9 , "Partial Supplementary European Search Report", dated Nov. 7, 2017, 13 pages.
PCT/US2015/063147 , "International Preliminary Report on Patentability", dated Jun. 22, 2017, 10 pages.
SG11201703526V , "PCT Written Opinion", dated Mar. 7, 2018, 6 pages.
Chipman, et al., U.S. Appl. No. 15/265,282 (Unpublished), Self-Cleaning Token Vault, filed Sep. 14, 2016.

(56) References Cited

OTHER PUBLICATIONS

Lopez, et al., U.S. Appl. No. 15/462,658 (Unpublished), Replacing Token on a Multi-Token User Device, filed Mar. 17, 2017.
Petition for Inter Partes Review of U.S. Pat. No. 8,533,860 Challenging Claims 1-30 Under 35 U.S.C. § 312 and 37 C.F.R. § 42.104, filed Feb. 17, 2016, Before the USPTO Patent Trial and Appeal Board, IPR 2016-00600, 65 pages.
Wang, U.S. Appl. No. 62/000,288 (unpublished), Payment System Canonical Address Format filed May 19, 2014.
Sharma et al., U.S. Appl. No. 62/003,717 (unpublished), Mobile Merchant Application filed May 28, 2014.
Kalgi et al., U.S. Appl. No. 62/024,426, (unpublished) Secure Transactions Using Mobile Devices filed Jul. 14, 2014.
Prakash et al., U.S. Appl. No. 62/037,033 (unpublished), Sharing Payment Token filed Aug. 13, 2014.
Hoverson et al., U.S. Appl. No. 62/038,174 (unpublished), Customized Payment Gateway filed Aug. 15, 2014.
Wang, U.S. Appl. No. 62/042,050 (unpublished), Payment Device Authentication and Authorization System filed Aug. 26, 2014.
Gaddam et al., U.S. Appl. No. 62/053,736 (unpublished), Completing Transactions Without a User Payment Device filed Sep. 22, 2014.
Patterson, U.S. Appl. No. 62/054,346 (unpublished), Mirrored Token Vault filed Sep. 23, 2014.
Dimmick, U.S. Appl. No. 14/952,514 (unpublished), Systems Communications With Non-Sensitive Identifiers filed Nov. 25, 2015.
Dimmick, U.S. Appl. No. 14/952,444 (unpublished), Tokenization Request Via Access Device filed Nov. 25, 2015.
Prakash et al., U.S. Appl. No. 14/955,716 (unpublished), Provisioning Platform for Machine-To-Machine Devices filed Dec. 1, 2015.
Wong et al., U.S. Appl. No. 14/966,948 (unpublished), Automated Access Data Provisioning filed Dec. 11, 2015.
Stubbs et al., U.S. Appl. No. 62/103,522 (unpublished), Methods and Systems for Wallet Provider Provisioning filed Jan. 14, 2015.
Mcguire, U.S. Appl. No. 14/600,523 (unpublished), Secure Payment Processing Using Authorization Request filed Jan. 20, 2015.
Flurscheim et al., U.S. Appl. No. 15/004,705 (unpublished), Cloud-Based Transactions With Magnetic Secure Transmission filed Jan. 22, 2016.
Flurscheim et al., U.S. Appl. No. 62/108,403 (unpublished), Wearables With NFC HCE filed Jan. 27, 2015.
Sabba et al., U.S. Appl. No. 15/011,366 (unpublished), Token Check Offline filed Jan. 29, 2016.
Patterson, U.S. Appl. No. 15/019,157 (unpublished), Token Processing Utilizing Multiple Authorizations filed Feb. 9, 2016.
Cash et al., U.S. Appl. No. 15/041,495 (unpublished), Peer Forward Authorization of Digital Requests filed Feb. 11, 2016.
Le Saint et al., , U.S. Appl. No. 15/008,388 (unpublished), Methods for Secure Credential Provisioning filed Jan. 27, 2016.
Kinagi, U.S. Appl. No. 62/117,291 (unpublished), Token and Cryptogram Using Transaction Specific Information filed Feb. 17, 2015.
Galland et al. U.S. Appl. No. 62/128,709 (unpublished), Tokenizing Transaction Amounts filed Mar. 5, 2015.
Rangarajan et al., U.S. Appl. No. 61/751,763 (unpublished), Payments Bridge filed Jan. 11, 2013.
Li, U.S. Appl. No. 61/894,749 (unpublished), Methods and Systems for Authentication and Issuance of Tokens in a Secure Environment filed Oct. 23, 2013.
Aissi et al., U.S. Appl. No. 61/738,832 (unpublished), Management of Sensitive Data filed Dec. 18, 2012.
Wong et al., U.S. Appl. No. 61/879,362 (unpublished), Systems and Methods for Managing Mobile Cardholder Verification Methods filed Sep. 18, 2013.
Powell, U.S. Appl. No. 61/892,407 (unpublished), Issuer Over-The-Air Update Method and System filed Oct. 17, 2013.
Powell, U.S. Appl. No. 61/926,236 (unpublished), Methods and Systems for Provisioning Mobile Devices With Payment Credentials and Payment Token Identifiers filed Jan. 10, 2014.
JP2017-531603 , "Office Action", dated Jul. 10, 2019, 4 pages.
RU2017124442 , "Office Action", dated Jun. 19, 2019, 16 pages.
RU2017124442 , "Notice of Decision to Grant", dated Sep. 27, 2019, 19 pages.
CN201580067131.4 , "Office Action", dated Oct. 8, 2019, 20 pages.
JP2017-531603 , "Notice of Decision to Grant", dated Oct. 23, 2019, 3 pages.
Application No. CN201580067131.4 , Office Action, dated Jul. 27, 2020, 10 pages.

* cited by examiner

PROVISIONING PLATFORM FOR MACHINE-TO-MACHINE DEVICES

CROSS-REFERENCES TO RELATED APPLICATIONS

This application is a non-provisional of and claims the benefit of U.S. Provisional Application No. 62/091,097, filed Dec. 12, 2015, which is herein incorporated by reference in its entirety for all purposes.

BACKGROUND

Households typically include a number of appliances associated with goods and services that are purchased by users on a regular basis. For example, consumers have refrigerators for storing food, gas meters for measuring gas usage, electric meters for measuring power usage, and water meters for measuring water usage. Consumers are often inconvenienced by regular paper bills associated with the goods and services. More convenient ways to provide and/or obtain resources for appliances are needed.

Embodiments of the present invention address these problems and other problems, individually and collectively.

BRIEF SUMMARY

Embodiments of the invention can be applied to the "Internet of things" where machines can interact with other machines without human intervention. In embodiments of the invention, machines can be provisioned with access credentials such as payment account numbers or payment tokens associated with payment account numbers. Such access credentials can be used by those machines to obtain (e.g., purchase) resources that are associated with those machines.

One embodiment of the invention is directed to a method of receiving, at a provisioning server computer, a device identifier associated with a machine-to-machine device and consumer information. The provisioning server computer may then bind the device identifier to the consumer information. The provisioning server computer may then provision the consumer information onto the machine-to-machine device.

Another embodiment of the invention is directed to a method. The method comprises receiving, at a service provider computer from a user device, a request to provision a first electronic device including a device identifier associated with the first electronic device. The first electronic device is configured to interact with at least one second electronic device independent of human interaction. The method also includes determining, by the service provider computer, based at least in part on the user device, access credentials. The method also includes identifying, by the service provider computer, based at least in part on the access credentials and the device identifier, a policy set relevant to the first electronic device; determining, by the service provider computer, from the access credentials, at least one access credential to be associated with the device identifier, and then providing, by the service provider computer, the at least one access credential to the first electronic device, the at least one access credential to be stored on the first electronic device and used to interact with the at least one second electronic device.

Another embodiment of the invention is directed to an electronic device comprising an input sensor configured to detect consumption of a resource, a processor, and a memory. The memory may include instructions that, when executed with the processor, cause the system to: receive, from a service provider computer, an access token and a policy; initiate a transaction in accordance with the policy by: establishing a communication session with an electronic device that manages the resource; requesting access to the resource based at least in part on the consumption of the resource detected by the input sensor; and providing the access token to the electronic device.

Another embodiment of the invention is directed to a method comprising storing, by a first electronic device; an access credential in a secure memory in the first electronic device. The method also includes determining, by the first electronic device and without human intervention, that a resource associated with the first electronic device needs to be obtained. Then, in response to determining that the resource needs to be obtained, the method includes transmitting the access credential to a second electronic device, the second electronic device operated by a resource provider. The resource provider thereafter conducts a transaction using the access credential and then provides the resource to the first electronic device without human intervention.

Further details regarding embodiments of the invention can be found in the Detailed Description and the Figures.

DETAILED DESCRIPTION

Figure 1:
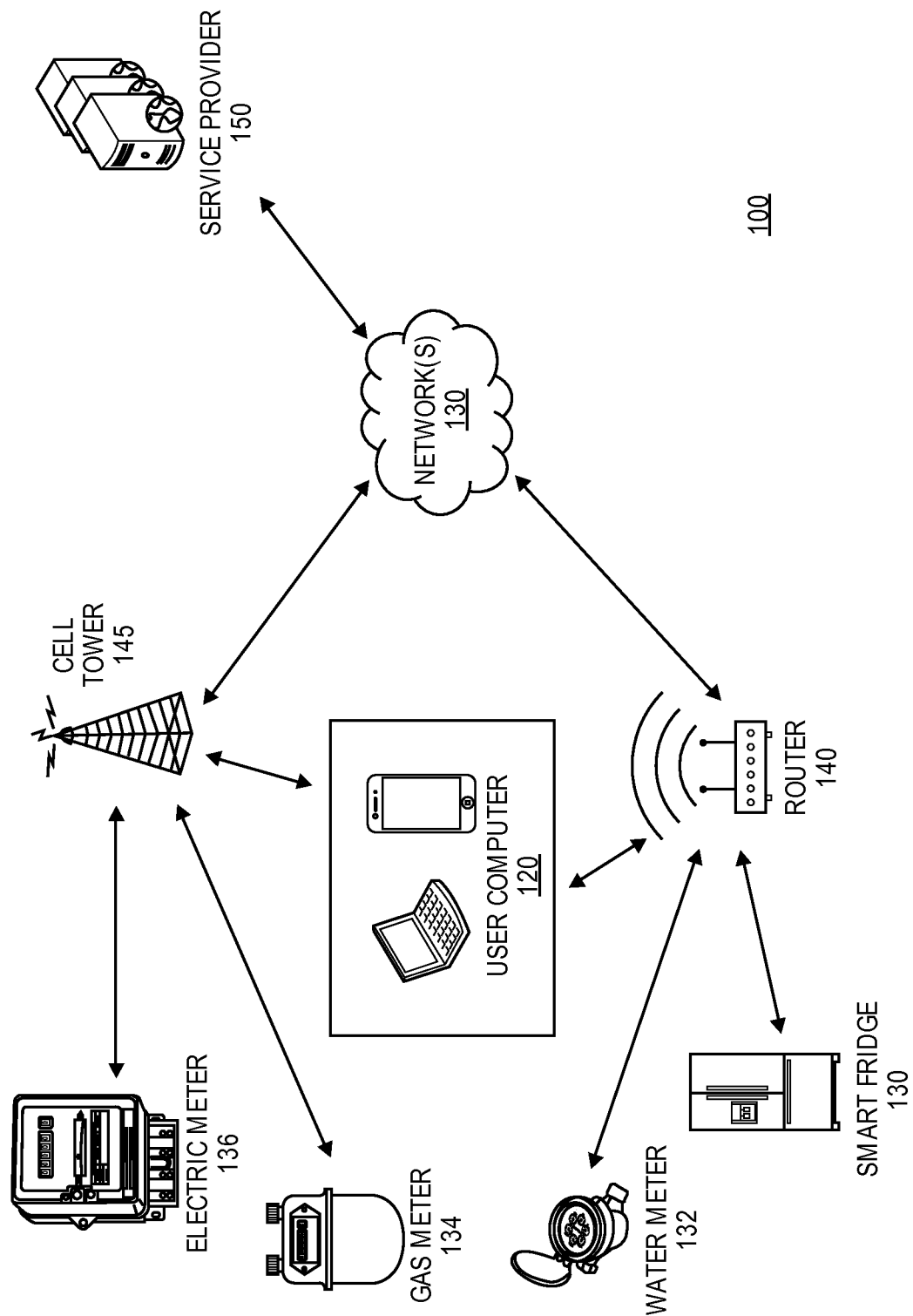
FIG. 1 depicts an example system comprising a number of components in accordance with at least some embodiments.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described herein include a system and platform for provisioning consumer information onto a machine-to-machine device so that it may provide consumer information upon request. Also described is a platform in which transactions may be performed automatically by a machine-to-machine device using provisioned consumer information. Prior to discussing specific embodiments of the invention, some terms may be described in detail.

A "service provider computer" may be a computer that is associated with a service provider. The service provider may provide any suitable service. For example, the service provider may be a merchant, a utility company, a payment processing network, a wallet provider, a merchant, an authentication cloud, an acquirer, or an issuer.

A "user device" may be a device that is operated by a user. Examples of user devices may include a mobile phone, a smart phone, a personal digital assistant (PDA), a laptop computer, a desktop computer, a server computer, a vehicle such as an automobile, a thin-client device, a tablet PC, etc. Additionally, user devices may be any type of wearable technology device, such as a watch, earpiece, glasses, etc. The user device may include one or more processors capable of processing user input. The user device may also include one or more input sensors for receiving user input. As is known in the art, there are a variety of input sensors capable of detecting user input, such as accelerometers, cameras, microphones, etc. The user input obtained by the input sensors may be from a variety of data input types, including, but not limited to, audio data, visual data, or biometric data. The user device may comprise any electronic device that may be operated by a user, which may also provide remote communication capabilities to a network. Examples of remote communication capabilities include using a mobile phone (wireless) network, wireless data network (e.g., 3G, 4G or similar networks), Wi-Fi, Wi-Max, or any other communication medium that may provide access to a network such as the Internet or a private network.

The term "provisioning" may include any preparation and/or configuring of a device to enable it to perform a function. For example, provisioning may include storing rules or instructions on a device to direct the device's actions. In some embodiments, a device may be provisioned with payment information associated with a user of the device. The payment information may enable the device to execute transactions on the user's behalf without active input from the user.

A "device identifier" may include any suitable distinctive set of characters used to identify a device. An exemplary device identifier may include any suitable number or type of characters (e.g., numbers, graphics, symbols, or other information) that may uniquely represent a device. By way of example, a device identifier may be a serial number, partial serial number, or device name or nickname. In some embodiments, a device identifier may be generated, based on a trusted hardware root. Additionally, the device identifier may be a temporary identifier for a particular device, such as a network address at which the device may be found.

An "access credential" may be any data or portion of data used to gain access to a particular resource. In some embodiments, an access credential may be a login and/or password for a user account. In some embodiments, an access credential may be include account information or a token associated with the account information.

"Account data" may refer to any content of an account of a user conducting a transaction. In some embodiments, account data may be payment account data that may be utilized to make a purchase. In other embodiments, account data may be any content associated with a user's non-financial account. For example, account data may include electronic files, photos, videos, and documents stored by the user's account. In some embodiments, account data may be stored by an authorization computer.

"Account information" may refer to any information surrounding an account of a user. For example, account information may include account data and one or more account identifiers. In some embodiments, the account identifier may be a PAN or primary account number. The PAN may be 14, 16, or 18 digits. Account information may also include an expiration date associated with the account, as well as a service code and/or verification values (e.g., CVV, CVV2, dCVV, and dCVV2 values).

A "policy set" may be a set of rules or configuration settings that indicates one or more actions are allowed and/or should be performed. In some cases, conditions upon which those actions are to be performed. In some embodiments, a policy set may include conditional statements, such as "if x_condition occurs, then perform y_action." In some embodiments, a policy set may include a list of transactions that are allowed for a particular electronic device or payment instrument. For example, a service provider may identify, based on a device identifier, a type of device that the policy set is related to. The service provider may then create a custom policy set for that device based on the device's type. For example, upon determining that a device is a water meter, the service provider may create a policy set for the water meter that only allows it to conduct transactions related to water usage. In this example, the policy set may be stored at the service provider in relation to the water meter (or a payment instrument associated with the water meter) and at least a portion of the policy set may be provisioned onto the water meter.

An "electronic device," may be any device that accomplishes its purpose electronically. An electronic device may have multiple functions. For example an electronic device may have a primary function and one or more secondary functions. A primary function may be the function that most closely aligns with the electronic device's purpose. An example of an electronic device may be a machine-to-machine device.

A "machine-to-machine device" may be any suitable electronic device capable of communicating with, and/or interacting with other devices. A machine-to-machine device may have a primary function that is unrelated to communicating with other electronic devices. For example, a machine-to-machine device may be a refrigerator that, in addition to preserving food, is capable of interacting with one or more other electronic devices. In some embodiments, a machine-to-machine device may be associated with a device identifier. The device identifier may be used by a service provider to determine the type of device for a particular machine-to-machine device. Examples of machine-to-machine devices may include gas and electric meters, refrigerators, lamps, thermostats, printers, automobiles, fire alarms, home medical devices, home alarms, motorcycles, boats, televisions, etc.

A "payment instrument" may be any device or data used for making payments. The payment instrument may be intangible (e.g., a software module or software application) or it may be a physical object. As examples of physical objects, the payment instrument may comprise a substrate such as a paper or plastic card, and information that is printed, embossed, encoded, or otherwise included at or near a surface of an object. A physical object may also be a hardware object, which may include circuitry (e.g., permanent voltage values). An intangible payment instrument may relate to non-permanent data stored in the memory of a hardware device. A payment instrument may be associated with a value such as a monetary value, a discount, or store credit, and a payment instrument may be associated with an entity such as a bank, a merchant, a payment processing network, or a person. A payment instrument may be used to make a payment transaction.

A "token" may include an identifier for a payment account that is a substitute for an account identifier, such as a primary account number (PAN). For example, a token may include a series of numeric and/or alphanumeric characters that may be used as a substitute for an original account identifier. For example, a token "4900 0000 0000 0001" may be used in place of a PAN "4147 0900 0000 1234." In some embodiments, a token may be "format preserving" and may have a numeric format that conforms to the account identifiers used in existing payment processing networks (e.g., ISO 8583 financial transaction message format). In some embodiments, a token may be used in place of a PAN to initiate, authorize, settle or resolve a payment transaction or represent the original credential in other systems where the original credential would typically be provided. In some embodiments, a token value may be generated such that the recovery of the original PAN or other account identifier from the token value may not be computationally derived. Further, in some embodiments, the token format may be configured to allow the entity receiving the token to identify it as a token and recognize the entity that issued the token. A token may be associated with a policy set.

In some embodiments, a set of payment tokens may be generated based upon a single user account. This might be useful if all payments made using those tokens are to be tied to and paid from the same account. For example, a user may have a credit card account number. Separate tokens (e.g., account number substitutes) may be generated for the different devices in the user's home. For instance, if the user has a washing machine, refrigerator, and a thermostat, then three different tokens may be generated and tied to the single credit card number. When transactions are conducted by these devices, all of the charges may be made to the single credit card account number.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. POS equipment) that indicates approval of the transaction. The code may serve as proof of authorization. As noted above, in some embodiments, a transaction processing computer may generate or forward the authorization response message to the merchant.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

In at least some embodiments of the invention, a user device may be utilized to detect local machine-to-machine devices. For example, the user device may be configured to perform a device discovery action that identifies all communicatively enabled electronic devices within range of the user device. By way of illustration, a user device may detect all electronic devices that are connected to WiFi within range of the user device. Once detected, the user device may receive a selection of at least one of the machine-to-machine devices from a user of the user device. In some embodiments of the disclosure, the user device may establish a connection with the selected machine-to-machine device and receive information related to the machine-to-machine device. In some embodiments, an additional step of authenticating that a user owns the machine-to-machine device may be required by the machine-to-machine device in order to establish a connection. For example, the user may be required to enter a password for the machine-to-machine device or press a button located on the machine-to-machine device. Information related to the machine-to-machine device may be presented by the user device within a graphical user interface executed from the user device. The user device may also establish a connection with a service provider computer that maintains and executes provisioning activities. In some embodiments, upon selection of the machine-to-machine device by the user, the service provider computer may send consumer information to the user device, which may subsequently be relayed by the user device to the machine-to-machine device. In this way, the consumer information may be provisioned onto the machine-to-machine device. The consumer information may include an access credential, consumer identifier, and/or policy set information.

In at least some embodiments, a user may connect to a service provider computer without first connecting to a machine-to-machine device. The user may provide, via the graphical user interface executed on the user device, a device identifier, such as a device name or device location (e.g., an Internet Protocol address), to the service provider computer. In some embodiments, the user may also provide consumer information (such as payment information) to be provisioned onto the device. In some embodiments, the consumer information may be stored at the service provider computer in relation to an account associated with the user. Once a device identifier has been provided to the service provider computer, the service provider computer may locate the device using one or more network connections and provision the device. In some cases, the user may also provide authentication information for the machine-to-machine device to the service provider. For example, the user may provide the service provider computer with a password to access the machine-to-machine device.

Once a machine-to-machine device has been provisioned with consumer information, the machine-to-machine device may perform one or more transactions using the consumer information. For example, an electronic device may send a request to the machine-to-machine device for some piece of consumer data. The machine-to-machine device may then consult a policy set regarding distribution of the piece of consumer data. If the distribution of the consumer data is identified by the policy set as being allowed, then the machine-to-machine device may respond to the received request with the consumer information. In another example, the machine-to-machine device may advertise the identity of the consumer as the machine-to-machine device's owner.

FIG. 1 depicts an example system 100 comprising a number of components in accordance with at least some embodiments. A user device 120, a service provider computer 150, and one or more machine-to-machine devices (e.g., smart refrigerator 130, water meter 132, gas meter 134, and electric meter 136) may all be in direct or indirect communication with one another via a network connection 130, a wireless router 140, a cell tower 145, or any other suitable means of communication.

As noted above, a machine-to-machine device may be any device capable of communicating with, and/or interacting with other devices. Each machine-to-machine device may be configured to perform one or more functions unrelated to the device's ability to interact. For example, the smart refrigerator 130 (one example of the M2M or machine-to-machine device) may comprise both refrigeration and computing capabilities. Although the smart refrigerator 130 is primarily utilized as a means of storing and refrigerating food, it has secondary functions that allow it to communicate with other devices, making it a machine-to-machine device. The machine-to-machine device may include a device identifier, which may be provided by a manufacturer of the machine-to-machine device. The device identifier may serve as a communication address for the machine-to-machine device, and it may be a secure device identifier based on a trusted hardware root of trust (so that integrity/confidentiality can be protected). In some embodiments, the manufacturer may be a trusted issuer of confidentially protected device identifiers.

The machine-to-machine device may include a secure execution environment such as a secure memory (e.g., Smartcard based technology available in low-power devices). In some embodiments, the secure memory may include a secure element. A secure element (SE) can be a tamper-resistant platform (typically a one chip secure microcontroller) capable of securely hosting applications and their confidential and cryptographic data (e.g. key management) in accordance with the rules and security requirements set forth by a set of well-identified trusted authorities.

Information provisioned by the service provider computer 150 onto the machine-to-machine device may be stored in the secure memory. The machine-to-machine device may include secure key storage to protect data at rest and encryption keys (i.e. a shared secret). The encryption keys could be unique-derived keys (UDKs), which can be derived from user account information and other unique information. The machine-to-machine device may also store instructions for communicating with other devices and/or instructions for initiating a payment transaction.

In some embodiments, the machine-to-machine device may be able to communicate wirelessly with the wireless router 140, the user device 120, and/or the cell tower 145 (e.g., via Wifi, Bluetooth (classic and BLE or Bluetooth Low Energy), IR, GSM, etc.). Also, the machine-to-machine device may be able to access the Internet via the wireless router 140, the user device 120, and/or the cell tower 145 in order to communicate with the service provider computer 150. For example, in the absence of direct connectivity (e.g., WWAN, GSM), the machine-to-machine device may connect with local devices (e.g., wireless router 140, user device 120 which can act as a hotspot, etc.) and rely on the devices for Internet connectivity and communication. Accordingly, the machine-to-machine device may be remotely accessible by other devices, and further it may include a user interface for management purposes (such as card activation and provisioning of information).

In some embodiments, the communication technology used by the machine-to-machine device may depend on the type of power source used by the machine-to-machine device. For example, if the machine-to-machine device has access to a regular, external power supply (e.g., as is common for smart refrigerators and other devices such as washer/driers, garage doors, cars, etc.) it may include a WiFi interface. Alternatively, if the machine-to-machine device relies on a battery instead of an external power supply, it may include a means for communication that consumes less power, such as low power Bluetooth interface, a ZigBee interface, a near field communication (NFC) or radio frequency (RF) interface, or any other suitable wireless access interface.

In some embodiments, the machine-to-machine device may instead be any other device that provides a household function. As noted above, FIG. 1 includes several devices such as a smart refrigerator 130, a water meter 132, a gas meter 134, and an electric meter 136. However, further examples of a household device include a television, lamp, fire alarm, home medical device, home alarm, washer/drier, garage door, car, and any other suitable device.

The service provider computer 150 may be configured to provision information onto the machine-to-machine device. In some embodiments, the information being provisioned onto the machine-to-machine device by the service provider computer 150 may be payment information. In some embodiments, the service provider computer 150 may be associated with an issuer of a payment instrument, a payment processing network associated with the payment instrument, a trusted third party, a digital wallet provider, a token server computer, and/or any other suitable entity.

Figure 2:
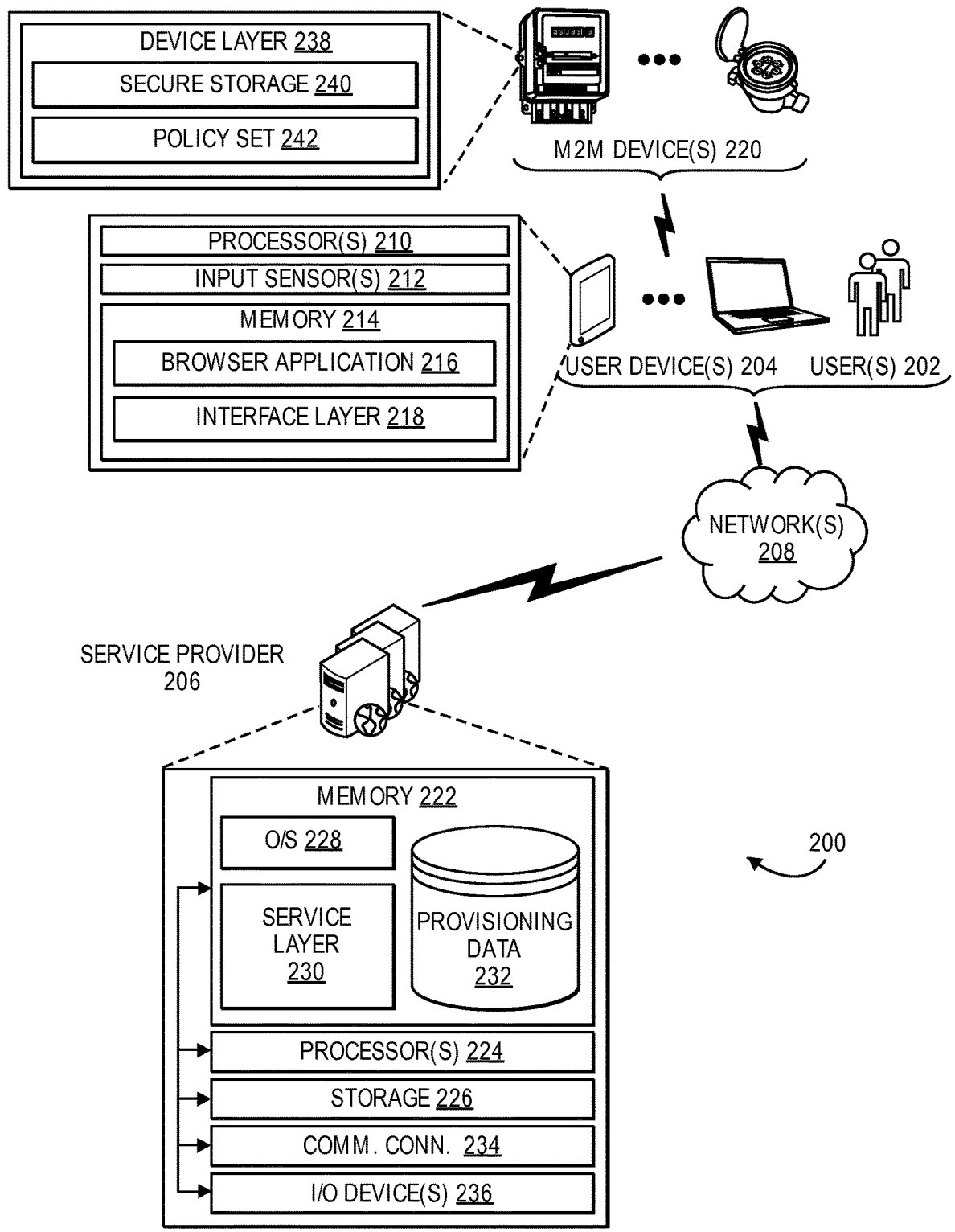
FIG. 2 depicts an illustrative example of a system or architecture in which techniques for provisioning a device with user-specific information may be implemented.

FIG. 2 depicts an illustrative example of a system or architecture 200 in which techniques for provisioning a device with user-specific information may be implemented. In architecture 200, one or more consumers and/or users 202 may utilize user devices 204. In some examples, the user devices 204 may be in communication with a service provider 206 via the network(s) 208, or via other network connections.

Each user device 204 may include one or more processors 210 capable of processing user input. The user device 204 may also include one or more input sensors 212 for receiving user input. As is known in the art, there are a variety of input sensors 212 capable of detecting user input, such as accelerometers, cameras, microphones, etc. The user input obtained by the input sensors may be from a variety of data input types, including, but not limited to, audio data, visual data, or biometric data. Embodiments of the application on the user device 204 may be stored and executed from its memory 214.

Turning to the contents of the memory 214 in more detail, the memory 214 may include a browser application 216. The memory 214 may also include an interface layer 218 that is capable of enabling user interaction with the service provider and/or a machine-to-machine (M2M) device 220. Although sample architecture 200 depicts an interface layer 218 as being included in the contents of the memory 214 of the user device 204, some embodiments may not include an interface layer 218 in memory 214 of the user device 204. In those embodiments in which the interface layer 218 is not included in memory 214, input received by the input sensors 212 may instead be processed by the service provider 206. This will be described in detail below.

In some embodiments, the interface layer 218 may be configured to enable user interaction with the service provider 206 and/or one or more machine-to-machine devices 220. For example, the interface layer 218 may be configured to allow a user to initiate a device discover process. In this process, the user device 204 may identify a number of machine-to-machine devices 220 within its vicinity. A number of device discovery techniques are known in the art for performing such a device discovery. Once the user device 204 has identified one or more machine-to-machine devices 220, the user may be given the ability to interact with the discovered devices. In some embodiments, the user may be required to authenticate that he or she has physical access to the device prior to being given the ability to interact with the machine-to-machine devices 220. For example, the user may be required to press a button on the device, input a password, or perform any other suitable authentication technique. In some embodiments, the interface layer 218 may allow the user device 204 to communicate with both the service provider 206 and the machine-to-machine devices 220 simultaneously. In some embodiments, the service provider may provision the machine-to-machine devices 220 with information using the connection established between the machine-to-machine devices 220 and the user device 204 and the connection established between the user device 204 and the service provider 206. In some embodiments, the interface layer 218 may allow a user to provision at least some information to the machine-to-machine devices 220 directly.

In some examples, the network(s) 208 may include any one or a combination of many different types of networks, such as cable networks, the Internet, wireless networks, cellular networks, and other private and/or public networks. While the illustrated example represents the users 202 accessing the service provider 206 via browser application 216 over the network(s) 208, the described techniques may equally apply in instances where the users 202 interact with a service provider 206 via the user device 204 over a landline phone, via a kiosk, or in any other manner. It is also noted that the described techniques may apply in other client/server arrangements (e.g., set-top boxes, etc.), as well as in non-client/server arrangements (e.g., locally stored applications, peer to-peer systems, etc.).

As described briefly above, the browser application 216 may allow the users 202 to interact with a service provider computer 206, such as to store, access, and/or manage data, develop and/or deploy computer applications, and/or interact with web content. The one or more service provider computers 206, perhaps arranged in a cluster of servers or as a server farm, may be configured to host a website (or combination of websites) viewable via the user device 204 or a web browser accessible by a user device 204 via the browser application 216. Although depicted in memory of the user device 204 in this example, in some embodiments the browser application 216 may be hosted at a server. For example, the user device 204 may be a thin client device capable of accessing a browser application 216 remotely. The browser application 216 may be capable of handling requests from many users 202 and serving, in response, various user interfaces that can be rendered at the user device 204 such as, but not limited to, a web site. The browser application 216 may be any type of application or interface that supports user interaction with a website, including those with user interaction, such as social networking sites, electronic retailers, informational sites, blog sites, search engine sites, news and entertainment sites, and so forth. As discussed above, the described techniques can similarly be implemented outside of the browser application 216, such as with other applications running on the user device 204. In some embodiments, the browser application 216 may be the interface layer 218.

In one illustrative configuration, the service provider computer 206 may include at least one memory 222 and one or more processing units (or processor(s)) 222. The processor(s) 222 may be implemented as appropriate in hardware, computer-executable instructions, firmware or combinations thereof. Computer-executable instructions or firmware implementations of the processor(s) 222 may include computer-executable or machine executable instructions written in any suitable programming language to perform the various functions described.

The memory 222 may store program instructions that are loadable and executable on the processor(s) 222, as well as data generated during the execution of these programs. Depending on the configuration and type of service provider computer 206, the memory 222 may be volatile (such as random access memory (RAM)) and/or non-volatile (such as read-only memory (ROM), flash memory, etc.). The service provider computer 206 may also include additional storage 226, such as either removable storage or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 222 may include multiple different types of memory, such as static random access memory (SRAM), dynamic random access memory (DRAM) or ROM. Turning to the contents of the memory 222 in more detail, the memory 222 may include an operating system 228 and one or more application programs or services for implementing the features disclosed herein including at least a module for generating payment tokens and/or provisioning information (e.g., payment tokens and payment rules) onto a machine-to-machine device 220 (service layer 230). The memory 222 may also include provisioning data 232, which provides provisioning rules for each device as well as token information. In some embodiments, the provisioning data 232 may be stored in a database.

The memory 222 and the additional storage 226, both removable and non-removable, are examples of computer-readable storage media. For example, computer-readable storage media may include volatile or non-volatile, removable or non-removable media implemented in any method or technology for storage of information such as computer-readable instructions, data structures, program modules or other data. As used herein, modules may refer to programming modules executed by computing systems (e.g., processors) that are part of the user device 204 or the service provider 206. The service provider computer 206 may also contain communications connection(s) 234 that allow the service provider computer 206 to communicate with a stored database, another computing device or server, user terminals, and/or other devices on the network(s) 208. The service provider computer 206 may also include input/output (I/O) device(s) and/or ports 236, such as for enabling connection with a keyboard, a mouse, a pen, a voice input device, a touch input device, a display, speakers, a printer, etc.

Turning to the contents of the memory 222 in more detail, the memory 222 may include an operating system 228, a database containing provisioning data 232 and the one or more application programs or services for implementing the features disclosed herein, including a service layer 230.

In some embodiments, the service layer 230 may be configured to receive data from the interface layer 218 and provision the machine-to-machine device 220. In a first illustrative example, a user 202 may send, via the user device 204 and a connection over network 208, an instruction to the service layer 230 to associate a particular machine-to-machine device 220 with the user. In this example, the user may provide a device identifier associated with the machine-to-machine device 220 to the service layer 230. The user may also provide an indication of a payment instrument with which to associate the machine-to-machine device 220. In this example, the service layer 230 may utilize network connection 208 to identify a machine-to-machine device 220 matching the device identifier. Once identified, the service layer 230 may provision the device with information related to the user or the user's account with the service provider. In a second illustrative example, the user 202 may connect to, via a user device 204 and a connection over network 208, the machine-to-machine device 220 and the service layer 230 simultaneously. In this example, the service layer 230 may provision the machine-to-machine device 220 with information using the connection between the service provider and the user device and the connection between the user device and the machine-to-machine device 220.

Provisioning data 230 may be predetermined or it may be dynamically generated. For example, the service provider computer 206 may generate a payment token upon receiving a request to provision a particular device. In this example, the generated token may be stored at the service provider in provisioning data 230 as well as being provisioned to the machine-to-machine device 220. In addition, a rule set may be generated that is specific to a user and a device. For example, the user may elect a particular brand of dish detergent that he or she prefers. In this example, the user may also elect to provision a smart dishwasher. The service provider may then generate a payment token for the dishwasher to use that is associated with a payment device owned by the user, as well as a set of rules to be associated with the payment token. The rules may indicate that the payment token may only be used to purchase dish detergent, and may even indicate that the payment token may only be used to purchase the specified brand of dish detergent.

A machine-to-machine device 220 may be any device capable of communicating with, and/or interacting with other devices, but is configured to perform a primary function unrelated to communicating with other devices. In some embodiments, the machine-to-machine device 220 may be a device used to monitor resource consumption. For example, the machine-to-machine device 220 may include a number of input sensors capable of detecting an amount of resource being consumed. By way of illustration, the machine-to-machine device 220 may be a water meter, gas meter, electricity meter, or other utility monitoring device. In some embodiments, the machine-to-machine device 220 may be a device configured to dispense a product or perform a service. For example, the machine-to-machine device 220 may be a vending machine or a clothing washing machine.

A machine-to-machine device 220 may include memory and one or more processors for storing and executing programmatic instructions. The machine-to-machine device 220 may include a device layer 238 configured to enable interaction between the service layer 230 of the service provider 206 and the programmatic instructions stored on the machine-to-machine device 220. The device layer 238 may include a secure execution environment such as a secure memory (e.g., smartcard-based technology available in low-power devices). In some embodiments, the machine-to-machine device 220 may also include a secure storage 240 (e.g., secure key storage) and one or more policy sets 242. Policy set 242 may include instructions for communicating with other devices, rules indicating what transactions are allowed, instructions for initiating a payment transaction and/or any other suitable information. The policy set may also include a set of conditional instructions for determining an action to be taken by the machine-to-machine device 220 and under what conditions the action should be taken. By way of illustrative example, a machine-to-machine device 220 may be provisioned with payment token information, a policy restricting use of the provided payment token, and a policy conditioning a payment upon an event. In this example, the machine-to-machine device 220 would, upon detection of the event, execute a payment transaction in accordance with the restrictive use policy.

Figure 3:
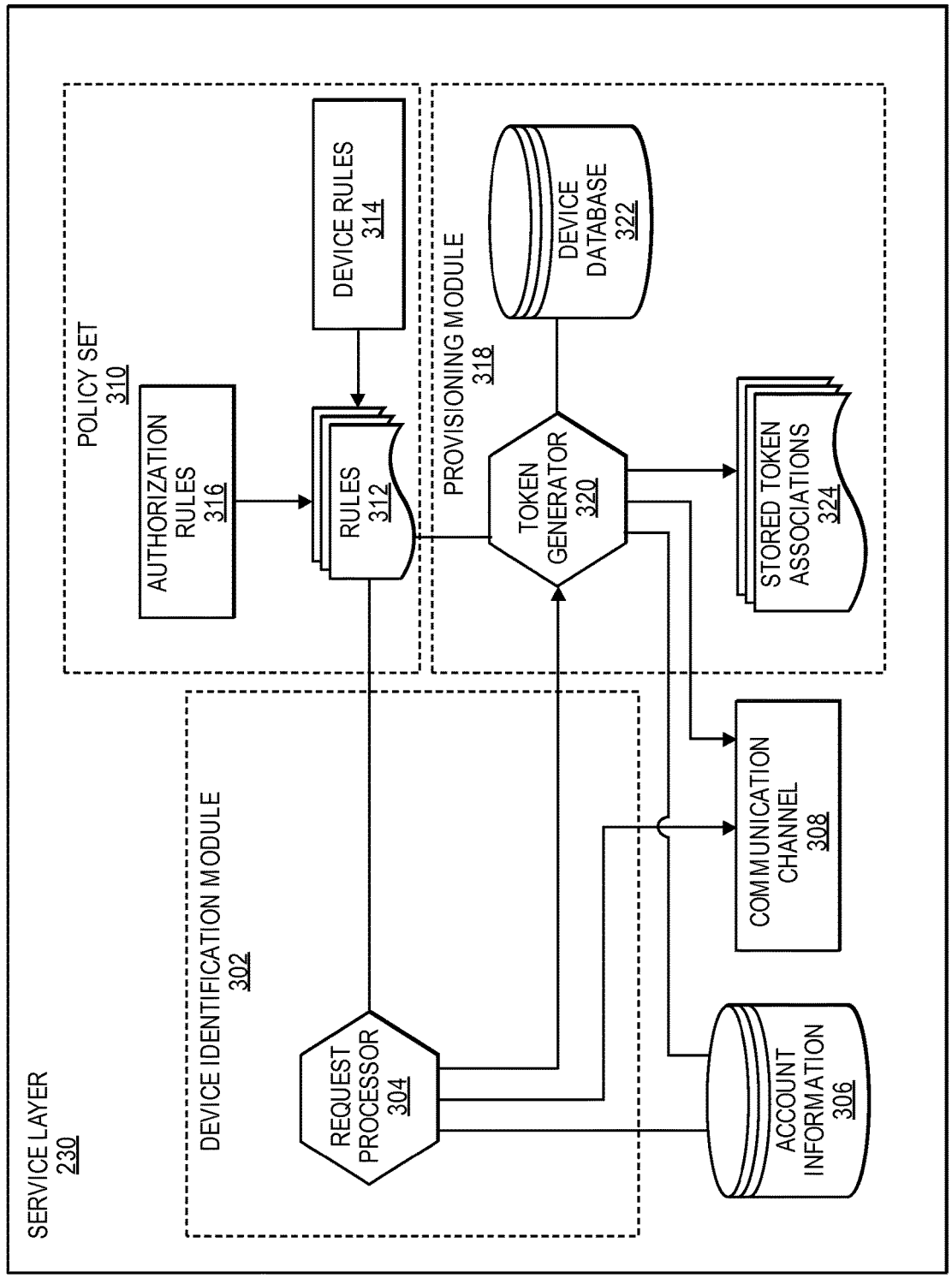
FIG. 3 depicts an illustrative example service layer data flow in accordance with at least some embodiments.

FIG. 3 depicts an illustrative example service layer data flow in accordance with at least some embodiments. In FIG. 3, service layer 230 is depicted as being an example service layer 230 of FIG. 2. Service layer 230 may include a device identification module 302 configured to identify a machine-to-machine device to be provisioned and establish a communication session with the device. In the device identification module 302, a request processor 304 may receive a request from a user device to provision a machine-to-machine device. The request processor 304 may have access to account information database 306. Account information database 306 may include various user information related to a user account. For example, the account information database 306 may include a user's demographic information, payment information, device information, or any other suitable user-related information.

Device identification module 302 may also establish a communication session with a machine-to-machine device via one or more communication channels 308. In some embodiments, the user device may be in direct communication with the machine-to-machine device to be provisioned. The service provider computer may identify the machine-to-machine device and may establish a communication session with the machine-to-machine device via the user device. In some embodiments, the service provider computer may receive a device identifier, such as a device name or device location (e.g., an Internet Protocol address) from the user device. The service provider may identify the machine-to-machine device on a network based at least in part on the provided device identifier. In some embodiments, the service provider computer may ascertain the type of machine-to-machine device upon, or prior to, establishing a connection with the device. For example, a service provider may determine that the machine-to-machine device is a water meter based on the device identifier supplied to it.

In accordance with at least some embodiments, the service layer 230 may include a policy set 310. Policy set 310 may include rules 312 that comprise at least one or more of device rules 314 and authorization rules 316. Device rules 314 may include rules related to transactions that are authorized for a particular device. For example, a device rule related to a water meter may indicate that the device is only able to perform transactions related to water usage. In another example, a device rule associated with a smart refrigerator may indicate that the refrigerator is only able to perform transactions related to acquisition of food. In some embodiments, the device rules 314 may include an indication of what electronic devices and/or merchants that device is able to interact with. In some embodiments, the device rules may be rules that are provisioned onto a machine-to-machine device itself.

Authorization rules 316 may include indications of what is authorized for a particular device or payment instrument. In some cases, the authorization rules may be based on user indicated preferences. For example, the user may create an authorization rule to associate the use of a particular payment instrument with a machine-to-machine device. In this example, even if the device is provisioned with multiple tokens associated with multiple payment instruments, only a transaction associated with the particular payment instrument will be authorized. The authorization rules may also include rules related to authorization of transactions. For example, the authorization rules may indicate that a payment for water usage made by a water meter should only be authorized once every two months. In this example, if the service provider computer receives a request to complete a transaction a second time in a two-month period, the service provider may decline the request according to the authorization rules 316. In some embodiments, the authorization rules 316 may include an indication that a particular transaction type (e.g., transactions for more than a threshold value, transactions with a particular vendor, or any other suitable transaction type) must be approved by the user. In this scenario, the user may be contacted via the user device for approval. For example, the service provider computer may send a short messaging service (SMS) message to the user device requesting authorization for the transaction. In this example, the transaction may be authorized upon receiving a response from the user device indicating that the transaction is authorized.

A service layer 230 may include a provisioning module 318 configured to generate configuration information and send it to the machine-to-machine device to be stored thereon. In some embodiments, the provisioning module 318 may include a token generator 320 configured to generate an access credential to be stored on the machine-to-machine device. In some embodiments, the provisioning module 318 may include a device database 322 for storing device information. In device database 322, a device identifier provided by a user may be associated with that user. In addition, device database 322 may include a type of device associated with each device identifier. In some embodiments, the device database 322 may include rules for generating a token that is device specific. In some embodiments, a relationship may be stored with regard to a token generated and the machine-to-machine device on which it is provisioned.

Token generator 320 may generate a token configured to allow access to one or more aspects of a user's account with the service provider. For example, a token may be generated for a particular machine-to-machine device in order to allow it to use payment information in transactions that it performs without exposing the actual payment information to a third party. In this example, the token may be provided to a third party by the machine-to-machine device in response to receiving a request to make a payment. The third party may subsequently present the token to the service provider to gain authorization for the release of funds related to the transaction. The service provider may determine whether the token received from the third party is authentic, whether the transaction is in compliance with policies associated with the originating machine-to-machine device, whether the funds for a payment instrument associated with the token are sufficient, and/or any other suitable prerequisites for authorization have been met. Token generator 320 may be responsible for the ongoing operation and maintenance of a token vault storing the generated tokens and a mapping between the tokens and account information and/or payment information associated with the tokens. The token generator may be responsible for token generation and issuance, as well as application of security and controls to the generated tokens. The token generator 320 may register a user device that requests a token and provision the generated token onto the user device and/or a machine-to-machine device.

In some embodiments, multiple tokens may be generated for a single payment instrument. The token generator 320 may access the device database 322 to identify any device specific token generation rules. In some embodiments, a token may be generated such that the source of the token may be ascertained. In other words, a token may be generated for a machine-to-machine device such that the device (or type of device) may be easily identified from the format or characters of the token. By way of illustration, a token created for a water meter device may begin with the characters WAT. This may allow for a service provider to immediately decline a transaction for water usage in which a provided payment token does not begin with the characters WAT. In some embodiments, the payment instrument information may not be ascertainable from the token. For example, the token may be generated based on a random number. The relationship between these tokens and the machine-to-machine device that they are provisioned on may be stored in device database 322. In some embodiments, the token may include information for a payment instrument that has been encrypted. For example, a token may be generated by encrypting a device identifier and user account number with an encryption key. In some embodiments, the encryption key may be based on the type of machine-to-machine device for which the token is being generated.

In embodiments of the invention, tokens may also be generated at any suitable interval. For example, in some embodiments, tokens may be generated and provisioned onto machine-to-machine devices only once, for every transaction, or for each set of a predetermined number of transactions. In some embodiments, a cryptogram may be accompany each token when a payment transaction is attempted by a machine-to-machine device that stores the token. The cryptogram may be generated by an encryption key (e.g., a limited use key) that is stored on the machine-to-machine device with the token.

The provisioning module 318 may be configured to provide the generated token and one or more rules 312 to the machine-to-machine device, to be used in future transactions via the communication channel 308. In some embodiments, the provisioning module 318 may store a relationship between the token and the machine-to-machine device in a separate data store 324. Subsequently, the service provider may receive a request to authorize a transaction from a third party. The request may include information related to the transaction and the payment token. In some cases, the request may also include the device identifier for the machine-to-machine device that provided the token. In the described scenario, the service provider may check to make sure that the token is associated with the device identifier. Upon determining that the relationship exists, the service provider may determine whether the transaction is in compliance with any rules associated with the device identifier before authorizing the transaction.

In some cases, a dynamic card verification value (dCVV) can be used. The dCVV may be generated based on a counter that changes after every transaction. For example, a machine-to-machine device and the service provider may independently track the number of transactions performed by the machine-to-machine device. When the machine-to-machine device initiates a transaction, a dCVV may be generated based on the tracked number of transactions. In some embodiments, the dCVV may be generated based on a time at which the transaction is initiated. The rules for generating a dCVV may be provided in a policy set that is provisioned onto the machine-to-machine device.

Figure 4:
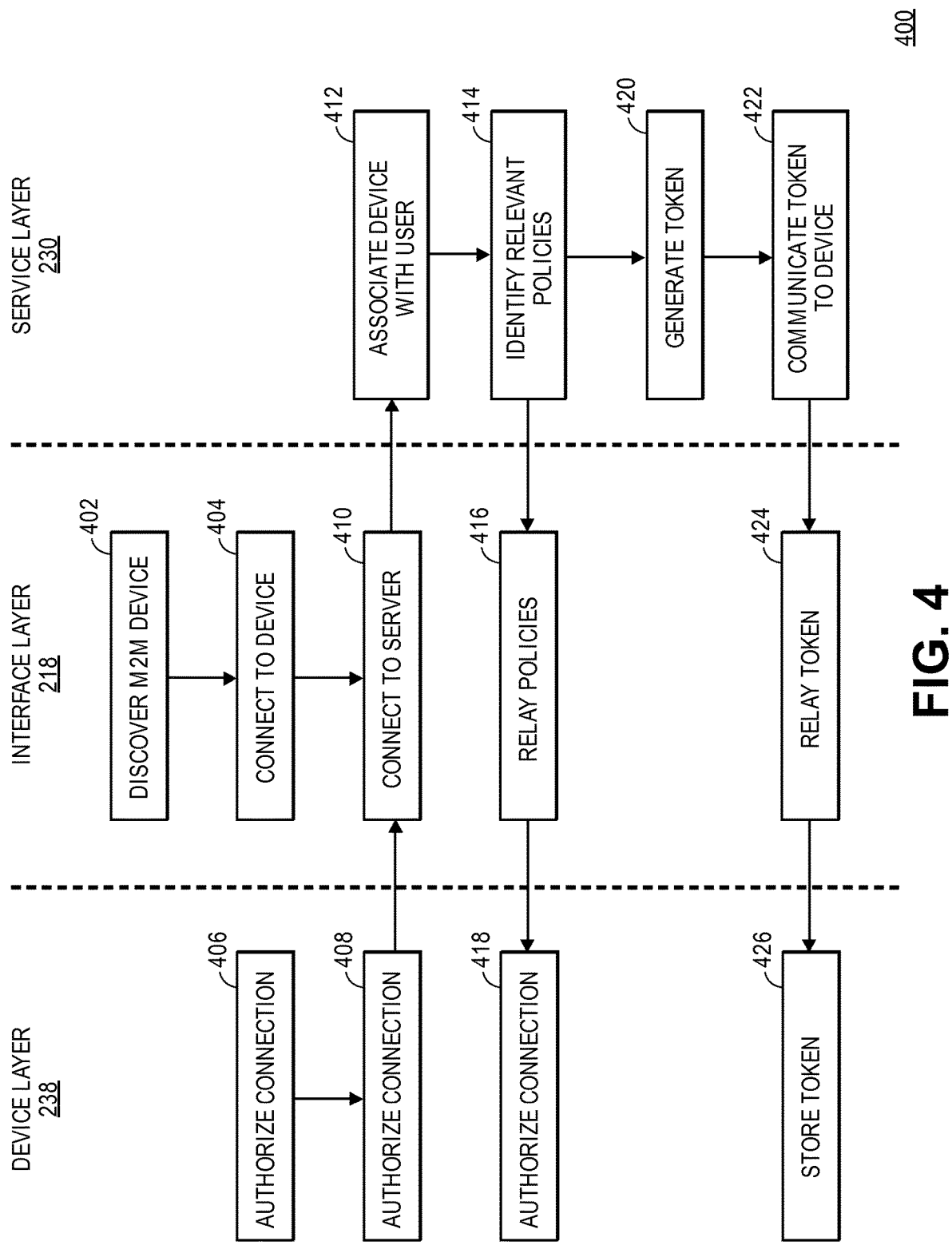
FIG. 4 depicts a flow diagram illustrating an example technique for provisioning a device with relevant information in accordance with at least some embodiments.

FIG. 4 depicts a process flow diagram illustrating an example technique for provisioning a device with relevant information in accordance with at least some embodiments. The process 400 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

In accordance with one embodiment, the process 400 of FIG. 4 may be performed by at least the one or more computer systems of the interface layer 218, the service layer 230, and the device layer 238 shown in FIG. 2. The code may be stored on a computer-readable storage medium, for example, in the form of a computer program including a plurality of instructions executable by one or more processors. The computer-readable storage medium may be non-transitory.

Process 400 may begin at 402, when a number of devices are discovered by an interface layer 218 of a user device via a discovery process. In some embodiments, the interface layer 218 may be implemented on one or more of the user computers 120 depicted in FIG. 1. In this process, multiple machine-to-machine devices having wireless connectivity may be identified as being within the vicinity of the user device. The interface layer 218 may then request a connection to a device layer 238 of a selected machine-to-machine device at 404. In some embodiments, the user device may connect to a machine-to-machine device using the same wireless capability that it used to discover the device. In some embodiments, a user device may utilize an alternative means of connecting to a machine-to-machine device. For example, the user device may connect to a machine-to-machine device via an infrared connection or it may be connected physically via a cable.

In some cases, the device layer 238 (which, in some embodiments may be implemented in one or more of the machine-to-machine devices 130, 132, 134, and 136 depicted in FIG. 1) may require that the user provide additional assurance that the user is the owner of the selected machine-to-machine device before allowing the connection at 406. For example, the device layer 238 may require that the user enter a password or press a button physically located on the machine-to-machine device to demonstrate physical possession of the machine-to-machine device. Once the user is confirmed as having authorization to access the machine-to-machine device, the device layer 238 may allow the interface layer 218 of the user device to establish a connection at 408.

The interface layer 218 may also establish a connection to the service layer 230 of a service provider computer at 410. In some embodiments, the service layer 230 may be implemented on the service provider 150 depicted in FIG. 1. The service layer 230 may subsequently identify the user and the machine-to-machine device to be provisioned in order to register the machine-to-machine device as being associated with the user. The service layer 230 may determine the identity of the user in a number of ways. In one example, the user may be required to log into an account maintained at the service provider computer. The account may include details indicating the user's identity. In another example, the service provider may determine an identity of the user based on receiving, in the connection request, an identifier related to the user device (e.g., an Internet Protocol address, a telephone number, a serial number, etc.). The machine-to-machine device may be identified from a device identifier relayed from the device layer 238 to the service layer 230 via the interface layer 218. In some cases, the user device may already have been registered with the service provider. The registration information for the device may then be used to identify the user. In other cases, the service provider may utilize a lookup service, such as an Internet Protocol address lookup or caller identification. Once the user's identity and the device identifier have been determined, the service layer may create an association between the two at 412. For example, the service layer 230 may store information in a database that indicates the device identifier is associated with the user.

Once the machine-to-machine device has been associated with the user, the service layer 230 may identify one or more policies relevant to the machine-to-machine device at 414. One or more policies may be configured by a user via interface layer 218. For example, the user may indicate a maximum purchase amount over a period of time (e.g., one week) for the machine-to-machine device. It may also indicate what types of goods or services may be purchased by the machine-to-machine device. In another example, the user may be notified when certain transactions are made or when one or more transactions involves a purchase exceeding a predetermined threshold. In some embodiments, a policy may only permit the machine-to-machine device to conduct transactions for certain resource types (e.g., digital or physical), for a certain amount, with certain merchants, and/or at certain times. For example, a smart refrigerator may only be allowed to purchase groceries. Further, the smart refrigerator may only be allowed to purchase groceries previously specified by the user, groceries that are currently inside the refrigerator, groceries that are running low, and/or groceries from stores located in a certain region. Some policies may specify when to alert the user about transactions and other events. For example, a message (e.g., email, SMS, phone call, etc.) may be sent to the user device any time the machine-to-machine device makes a purchase or pays a bill. In some embodiments, a transaction may not be allowed to take place unless the user indicates approval of the transaction (e.g., by replying to the message above).

In some embodiments, the user may only be informed if a transaction is attempted that relates to an amount that exceeds or is below a determined threshold. Additionally, a policy may specify what devices (such as the user device) can access the device layer 238 and change settings/policies on the device layer 238.

In some embodiments, a policy may also provide an encryption mechanism. For example, the service provider may maintain an encryption key pairing with respect to a device type. In this example, the service provider may provision the device with one key of the key pairing to be used by the device to encrypt transaction information. Further, access mechanisms and a password may be configured, and policies can be set regarding expired payment information (e.g., how to obtain new payment information).

In some embodiments, at least some of the policies identified as being relevant at 414 may be provisioned onto the machine-to-machine device. To do this, the policies may be transmitted to the interface layer 218 of the user device and further relayed to the device layer 238 by the user device at 416. The device layer 238 may subsequently store the received policies in a memory of the machine-to-machine device at 418. If the machine-to-machine device receives a request to complete a transaction, it may consult the stored policy information to determine if the transaction is authorized.

In some embodiments, the service provider computer may generate a token or other access credential to be associated with the machine-to-machine device at 420. In some embodiments, when the service provider issues a token for a primary account number or payment instrument associated with an account, the account holder (user) may be asked to participate in the identification and verification process during token generation. For example, the user may be asked to provide identification information to ensure that the token is being generated for an account rightfully owned by the user. By way of illustration, the user may be asked to log into an account associated with the user by providing a username and password. In some embodiments, the user may already be associated with account information to be used in generating the token. For example, information stored in a user's account, such as payment information or a primary account number, may be used to generate the token. In some embodiments, the user may provide information to the service provider with which to generate a token. For example, the user may provide, via the interface layer 218, a credit card number to be associated with the generated token. In some embodiments, tokens that are generated by the service layer 230 may be accompanied by a token expiration date. The token expiration date may meet the format of a primary account number expiration date and may be the same date or different date than that of the actual primary account number. In various embodiments, tokens that are generated in response to a token request from the user device are only valid for transactions related to the primary function of the device for which the token has been issued. In some embodiments, the service provider may generate a token assurance level to be provisioned onto a machine-to-machine device with the token. One technique for doing this is described in U.S. patent application Ser. No. 14/514,290, to Powell et al., which is herein incorporated by reference.

Once the token or other access credential has been generated, it may be provisioned onto the machine-to-machine device at 422. To do this, the access credential may be transmitted to the interface layer 218 of the user device and further relayed to the device layer 238 by the user device at 424. The device layer 238 may subsequently store the received access credential in a memory of the machine-to-machine device at 426. Once fully provisioned with the access credential and any relevant policies, the machine-to-machine device may initiate, or respond to a request for, a transaction with at least one other electronic device.

Although the above description provides that the interface layer 218 may be present on a user device separate from the machine-to-machine device, it should be noted that, in at least some embodiments, the interface layer 218 may reside on the machine-to-machine device itself. For example, a machine-to-machine device may include a display and one or more input devices configured to receive user input. In these embodiments, the user may request provisioning of the machine-to-machine device as described in the current specification from the machine-to-machine device.

In some embodiments, the service provider may receive an indication that the access credentials associated with a user's account have changed or are otherwise not valid. For example, the service provider may determine that the user's payment information has expired. In these cases, the user may be required to provide new payment information. For example, the user may be required to update his or her account with a new credit card number. Upon determining that the payment information has been updated, the service provider may generate a second access credential to be associated with the new payment information. For example, upon receiving updated credit card information, the service provider may generate a second token to be associated with the new credit card information. In some embodiments, the second access credential may be provisioned onto the machine-to-machine device without further user interaction. For example, upon generation of a new access credential to be associated with a machine-to-machine device, the service provider may execute 422-426 of the process 400 in order to provision the new access credential onto the machine-to-machine device.

Figure 5:
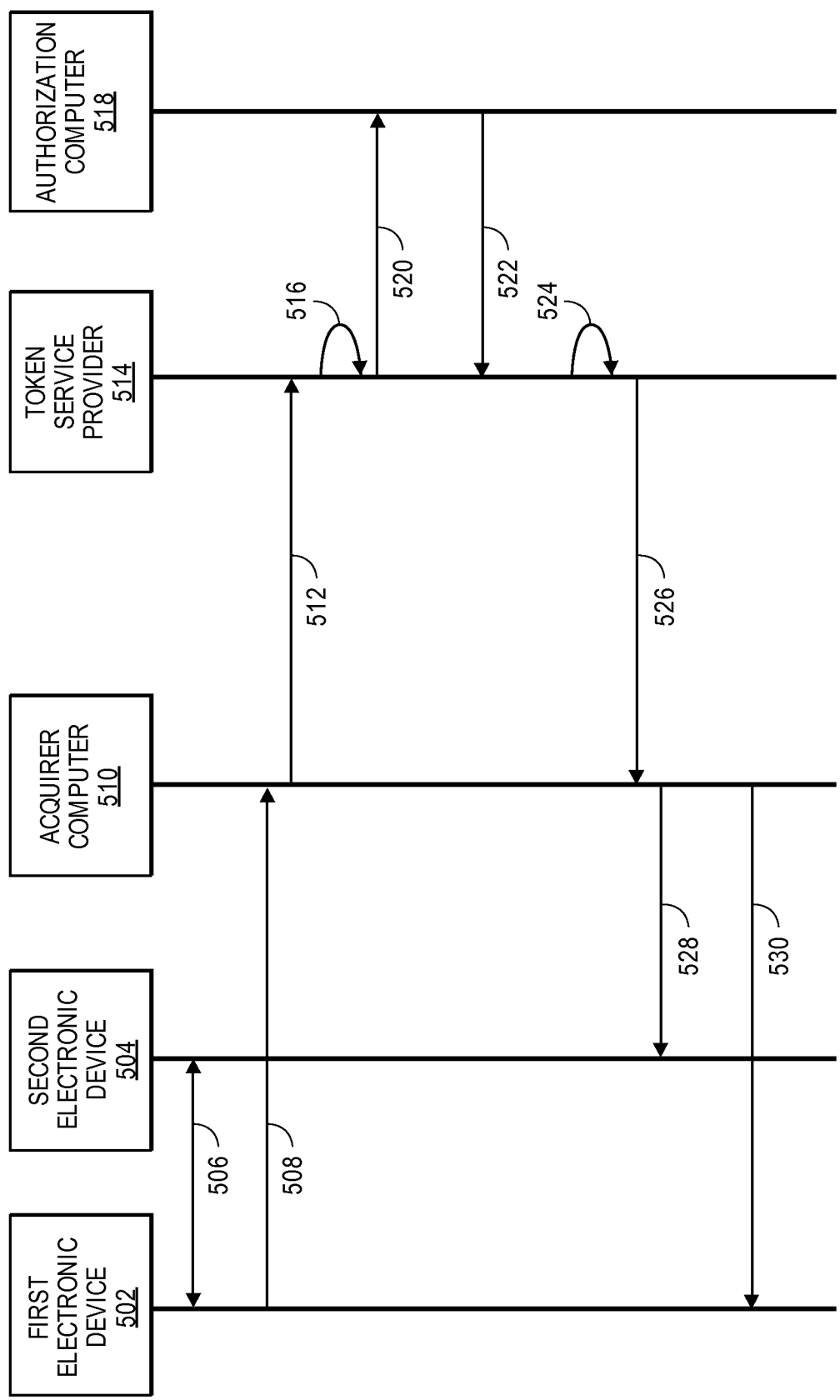
FIG. 5 depicts a flow diagram illustrating a payment processing technique in accordance with at least some embodiments.

FIG. 5 depicts a flow diagram illustrating an automated payment process in accordance with some embodiments of the invention. In FIG. 5, a first electronic device 502, which may be a machine-to-machine device, determines that a transaction should be conducted with respect to a resource (e.g., that a resource needs to be obtained). This determination may be made without human intervention. For example, the first electronic device may utilize a set of rules that dictate under what circumstances the resource should be obtained. The first electronic device may establish a communication session with a second electronic device 504 owned/operated by a resource manager at 506. For purposes of illustration, the first electronic device 502 may be a smart refrigerator, while the second electronic device 504 may be a server computer that is operated by a merchant such as a grocery store.

In a first example, the first electronic device may include a policy that indicates a payment for resource usage should be made on the first of each month. In this example, the first electronic device, upon determining that a date/time condition in the policies has been met, may initiate contact with the second electronic device to request a transaction. In a second example, the first electronic device 502 may establish a communication session with the second electronic device 504 upon detecting the presence of the second electronic device. The first electronic device may communicate, via the communication session, an amount of a resource that it requires. The second electronic device may consult a rate chart and/or an item catalog to determine an appropriate reimbursement for the requested amount of the resource. In some embodiments, the second electronic device may also provide a shipping cost to the first electronic device. If the transaction details (amount of the resource, proposed reimbursement, shipping costs, etc.) are in compliance with policies stored on the first electronic device, then a transaction authorization request may be initiated from either the first electronic device or the second electronic device.

For purposes of illustration, the first electronic device 502 may be a smart refrigerator, while the second electronic device 504 may be a server computer that is operated by a merchant such as a grocery store. The first electronic device may determine (through internal sensors) that it is low on eggs and milk. Upon this determination, the first electronic device may contact the second electronic device operated by a grocery store. When contacting the grocery store, the first electronic device 502 may provide a payment token to the second electronic device 504, and the grocery store may conduct the payment transaction as further explained below. After the payment process has concluded, the grocery store may then automatically send the milk and eggs to the household that has the first electronic device. All of this may be performed without any user intervention.

In some embodiments, the transaction authorization request message may be initiated by the first electronic device 502 by sending the transaction details and payment information to an acquirer computer 508 at 510. The acquirer computer 508 receives the transaction details and payment information and determines an appropriate payment entity to route an authorization request message to. In some embodiments, the format and/or characters of the payment information may be used to indicate the payment entity. For example, a payment information number beginning with 4012 may be associated with a payment processing network such as Visanet. In some embodiments, the acquirer computer may determine that the payment information is associated with a token. Token information may be maintained by token service provider. A token service provider may be an entity, not necessarily associated with the actual payment entity, that stores and maintains relationships between tokens and actual account numbers used for payment. The token service provider may operate one or more computers, as well as the service layer 230 depicted in FIGS. 2-4.

Once the acquirer computer 510 has determined where an authorization request is to be routed, the acquirer computer may transmit the authorization request message to the appropriate payment entity at 512. If the payment information comprises a token, then the authorization request message may be routed to a token service provider 514 at 512. The token service provider may be provided in a transaction processing network. An exemplary transaction processing network may include VisaNet™. Transaction processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The transaction processing network may use any suitable wired or wireless network, including the Internet.

The token service provider 514 may query a token vault (a data store configured to store associations between tokens and actual payment information) to retrieve actual payment account information details. In this way, the token service provider 514 de-tokenizes the payment token to obtain an actual primary account number or PAN at 516. In some embodiments, the token service provider 514 may perform one or more mathematical calculations to identify actual payment account information from the token, or it may simply retrieve the actual payment account information. The token service provider 514 may then forward the authorization request message, along with the actual payment account information, to the authorization computer 518 operated by the payment entity (which may be an issuer) at 520. In some embodiments, the authorization request message may also include the token so that the authorization entity is able to associate the token with the authorization request.

The authorization computer 518 receives the authorization request message at 520 and determines if the transaction should be authorized. For example, the authorization computer may decline the transaction if there is a high likelihood of fraud. In another example, the authorization computer may decline the transaction if the payment account has insufficient funds. Once the authorization computer has decided whether to approve or decline the transaction, an authorization response message may be sent to the token service provider at 522.

The token service provider 514, upon receiving the authorization response message, may re-tokenize the message at 524 by querying the token vault to identify the token from the actual payment account information included in the authorization response message. The token service provider may then remove any actual payment account information out of the response and replace it with the token payment information. The authorization response message comprising the payment token may then be provided to the acquirer computer at 526.

The acquirer computer may, upon receiving the response, determine whether the transaction has been approved or declined. In either case, the authorization response message may be provided to the second electronic device at 528 and/or the first electronic device at 530. If the transaction has been authorized, the first electronic device may complete the transaction with the second electronic device. The completion of the transaction may be conducted without human intervention. For example, the transaction may be conducted without acquiring authorization from a user or otherwise requiring action on a user's behalf.

At some later point in time, a clearing and settlement process between the acquirer computer 510 and the authorization computer 518 may occur, and funds may be transferred from the authorization computer to the acquirer computer.

It should be noted that although the second electronic device is depicted as being a separate device from the acquirer computer, the two devices may be the same device. For example, the first electronic device may contact the acquirer computer directly to request an amount of a resource. Additionally, the token service provider and authorization computer may be maintained by the same entity. For example, both the token service provider and the authorization computer may be maintained and operated by a credit card issuer. In some embodiments, the payment information may not be tokenized (though it might still be encrypted). In these embodiments, one skilled in the art would recognize that figure references 508, 514, and 524 are not necessary to the disclosure. Additionally, the acquirer computer may communicate with the authorization computer directly.

Figure 6:
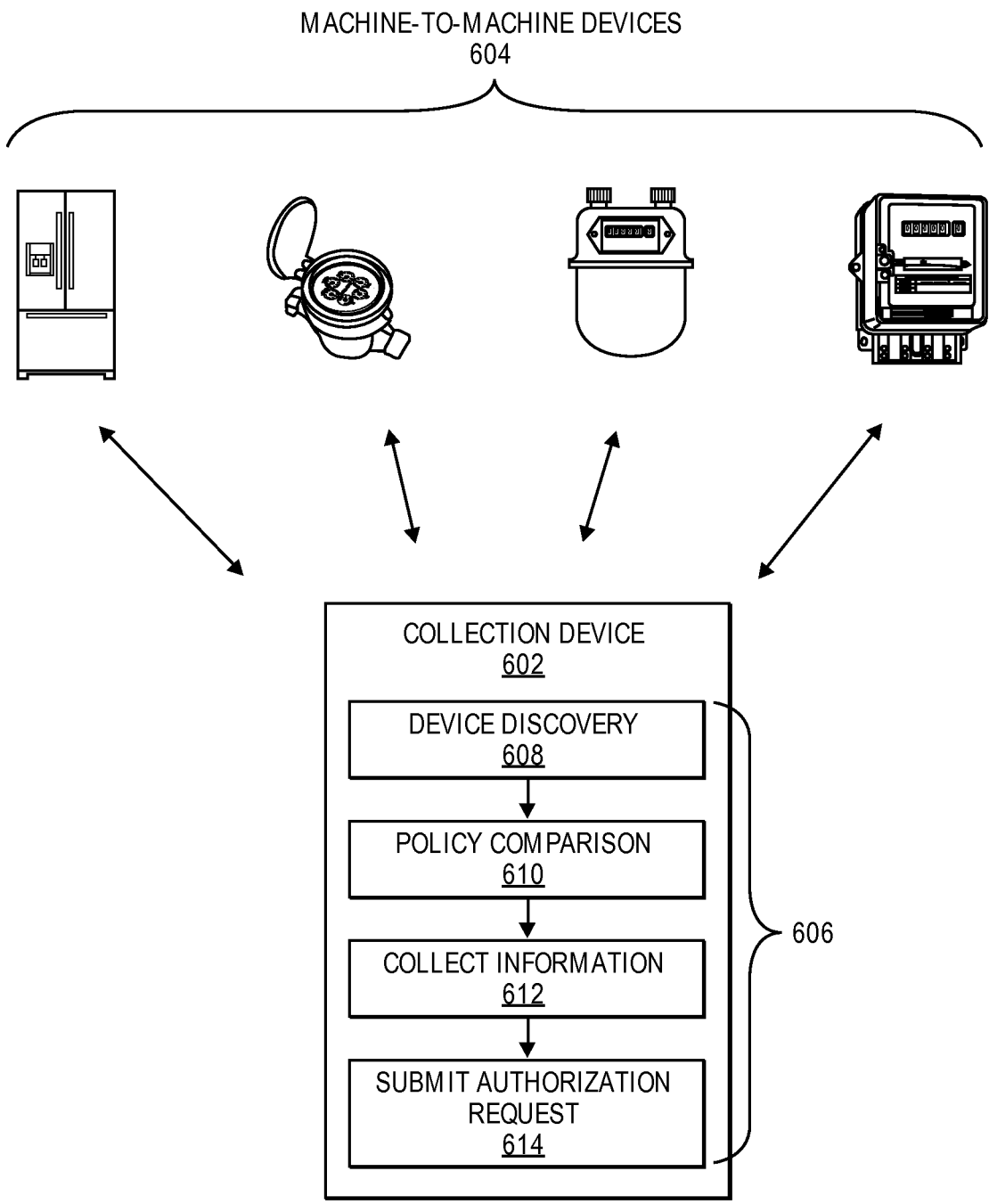
FIG. 6 depicts the use of a collection device to interact with a provisioned machine-to-machine device in accordance with at least some embodiments.

FIG. 6 depicts the use of a collection device to interact with a provisioned machine-to-machine device in accordance with at least some embodiments. In some embodiments, a machine-to-machine device may be connected to a network. Machine-to-machine devices that are connected to a network may contact a resource manager directly in order to conduct a transaction. For example, an electric meter in communication with a server operated by the local utility company may contact the server directly to make a payment for electricity usage in accordance with at least some embodiments. However, if the machine-to-machine device is not connected to a network, then a transaction needs to be conducted in a different manner. One such technique is illustrated by FIG. 6, in which a collection device 602 may enter the proximity of one or more machine-to-machine devices 604. The collection device 602 may be any electronic device operated by, or with authority from, a resource manager. For example, the collection device 602 may be a meter reader configured to communicate with an electric meter to collect electricity usage information on behalf of a local utility company. In some embodiments, the collection device may be in communication with a backend server or other electronic device. For example, a collection device may have a connection to a wireless network (e.g., 3G, 4G or similar networks) to a server hosted by the resource manager.

The collection device 602 may be configured to perform one or more steps of a collection process 606. In this example, the collection device 602, upon entering a geographic location or in response to a request by a user of the collection device, may attempt to discover local machine-to-machine devices at 608. Once discovered, the collection device may initiate a rule comparison. In some embodiments, the collection device 602 may send a discovered machine-to-machine device an indication of a type of transaction to be performed. The machine-to-machine device 604 may then compare the transaction type to a stored policy to determine whether the transaction type is one that the machine-to-machine device is authorized to perform. If the machine-to-machine device 604 is authorized to perform the transaction, then it may transmit a response to the collection device 602. In some embodiments, the machine-to-machine device 604 may publish a type of transaction that it is authorized to perform. For example, the electric meter mentioned above may publish that it is able to pay for electricity usage. In this example, a meter reader (collection device 602) may detect the electric meter (machine-to-machine device 604) and identify that it is capable of performing transactions related to electricity usage. In this example, the meter reader may compare the published transaction type to a policy stored on the meter reader to determine that a transaction should be performed at 610.

Once the machine-to-machine device 604 and the collection device 602 have determined that a transaction is authorized, the two electronic devices may conduct a transaction. This may involve the collection device collecting transaction information from the machine-to-machine device at 612. The collection device 602 may collect resource information from the machine-to-machine device. For example, the collection device may collect information related to an amount of resource used or an amount of resource needed. Either the collection device 602 or the machine-to-machine device 604 may then calculate an appropriate reimbursement for the resource. If the transaction is in compliance with the policies stored on the machine-to-machine device 604, then the collection device 602 may collect an access credential or payment information from the machine-to-machine device at 612. In some embodiments, the collection device 602 may send credential information to the machine-to-machine device 604 to validate that the collection device 602 is authorized to collect the payment information.

Upon receiving the credential information from the machine-to-machine device, the collection device may contact the service provider or an authorization server to request release of a payment in accordance with the transaction at 614. (e.g., in a manner similar to or different than the flow in FIG. 5). The service provider may authorize the payment upon validating the payment information or access credential and ensuring that the transaction is in compliance with policies stored at the service provider. In some embodiments, the collection device 602 may not have communication access to the service provider. The collection device 602 may store the transaction information until it is able to request authorization for the transaction. It should be noted that although the collection device 602 is described as requesting authorization for a transaction, the collection device 602 may provide the transaction information to a server maintained by the resource manager, and the resource manager may contact the service provider to get authorization for the transaction.

By way of illustration, an example machine-to-machine device may be a refrigerator that is authorized to purchase groceries. In this example, the machine-to-machine device may have stored in memory a grocery list (a list of items that are to be purchased) as well as one or more policies. At least some of the policies may indicate a maximum amount that may be spent on a particular item. In this example, a mobile grocery vendor may enter the vicinity of the refrigerator and, using a collection device, determine that the refrigerator is in need of the one or more items from the grocery list. The refrigerator may provide the grocery list to the collection device and the collection device may consult an item catalog to determine prices for each of the items on the list. The collection device may then provide the determined prices to the refrigerator. In some embodiments, the refrigerator may subsequently determine whether the price for each grocery item involved in the transaction is in compliance with the policies, and remove any grocery item from the transaction that is not. In some embodiments, a policy may indicate a maximum amount to spend on a total order. Upon determining that the transaction is in compliance with the policies, the transaction is completed. The mobile grocery vendor may leave the requested groceries on the doorstep of the house containing the refrigerator. The collection device collects payment information from the refrigerator and sends an authorization request to the service provider to gain access to payment information.

In some embodiments, a token may be generated for a particular type of machine-to-machine device without having been provided a device identifier. The token may be stored on a user device for future use. For example, a user may request generation of a token related to parking meters. In this example, the service provider computer may generate a token to be stored on the user device that is associated with the user's payment information and will allow parking meters to conduct transactions. The user may subsequently utilize the user device to perform a transaction with a parking meter. For example, the user may utilize the user device to interact with a parking meter and request parking. The user device may then provision the payment token onto the parking meter. In this example, the parking meter may be configured to detect the presence of a vehicle and may continue to toll the provided payment token for as long as the vehicle is present. In another example, the user may elect a timeframe from the parking meter for which to be billed.

In accordance with at least some embodiments, a machine-to-machine device may maintain a "tab" or balance for a particular user. For example, in a scenario in which a vending machine with wireless capabilities (a machine-to-machine device) is placed outside of network coverage, the vending machine may be configured to collect tokens from one or more user devices in exchange for vended products. In this scenario, the user device may, in response to receiving a request for payment, provide the vending machine with a pre-generated token. The vending machine may check the format and/or content of the provided token in order to assess whether the token is likely to be valid. If the vending machine determines that the token is likely valid, then it may store the token in relation to a balance owed for the user device and dispense a requested good. A collection agent may enter the proximity of the vending machine with a collection device at a subsequent time, at which point the vending machine may provide any stored payment tokens and balances to the collection device. In some embodiments, the collection device may contact the service provider for authorization of the previously conducted transactions upon re-entering network coverage. After transmitting the information to the collection device, the vending machine may continue to maintain the token, but with a zeroed balance, or it may delete the payment token and balance.

Some machine-to-machine devices may be associated with a single user and some machine-to-machine devices may be associated with multiple users. For example, a machine-to-machine device may include provisioned information related to multiple users that consume a single resource. In this example, the machine-to-machine device may enter into a transaction related to the resource for each user either individually or within a single transaction. By way of illustration, a household may consist of three roommates that each split utility payments equally. In this illustration, the water meter may be provisioned with payment instrument information for each of the three roommates. Upon receiving a request to make a payment for water usage, the water meter may present each of the three payment instruments to each be charged for a third of the water usage. In this illustration, payment instrument information for each of the three roommates may be stored on the machine-to-machine device and the service provider computer may store an indication that all three roommates are associated with the water meter.

Additionally, a machine-to-machine device may be provisioned temporarily. By way of illustration, consider a scenario in which a user rents a vehicle. The vehicle may be provisioned with the user's payment information for the duration of the rental. The rental vehicle may be a machine-to-machine device in that as the rental vehicle passes a toll booth, the vehicle may be configured to interact with an electronic device within the toll booth to pay a fee for using the road. In this scenario, the toll may be charged directly to the user's payment information instead of to the vehicle rental company. Upon the return of the vehicle to the rental company, the provisioned payment information may be removed from the vehicle. This limits risk of nonpayment for the vehicle rental company and prevents the user from paying toll fees that have been marked up by the vehicle rental company.

Figure 7:
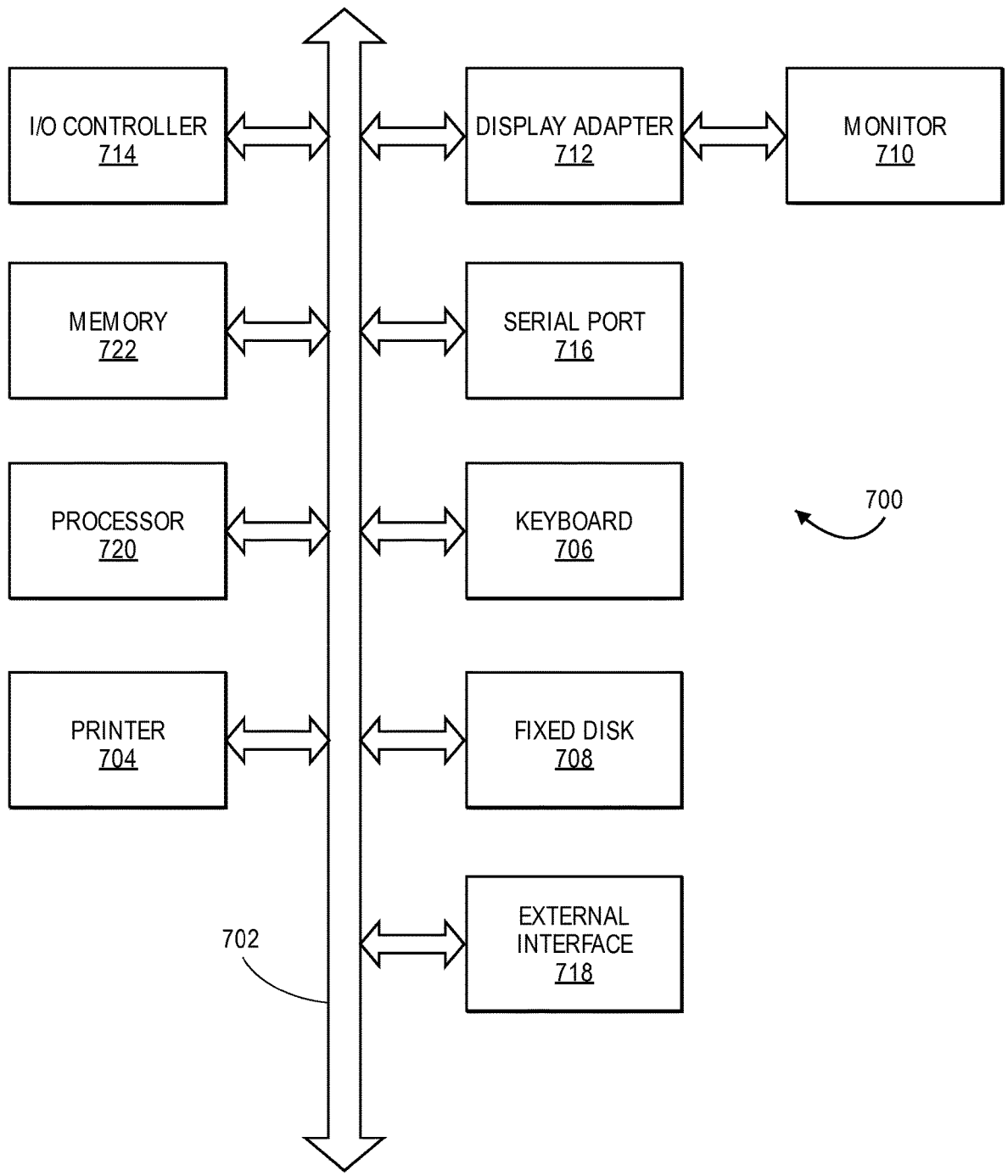
FIG. 7 depicts aspects of elements that may be present in a computer device and/or system configured to implement a method and/or process in accordance with some embodiments of the present invention.

In accordance with at least some embodiments, the system, apparatus, methods, processes and/or operations for event processing may be wholly or partially implemented in the form of a set of instructions executed by one or more programmed computer processors such as a central processing unit (CPU) or microprocessor. Such processors may be incorporated in an apparatus, server, client or other computing device operated by, or in communication with, other components of the system. As an example, FIG. 7 depicts aspects of elements that may be present in a computer device and/or system 700 configured to implement a method and/or process in accordance with some embodiments of the present invention. The subsystems shown in FIG. 7 are interconnected via a system bus 702. Additional subsystems such as a printer 704, a keyboard 706, a fixed disk 708, a monitor 710, which is coupled to a display adapter 712. Peripherals and input/output (I/O) devices, which couple to an I/O controller 714, can be connected to the computer system by any number of means known in the art, such as a serial port 716. For example, the serial port 716 or an external interface 718 can be utilized to connect the computer device 700 to further devices and/or systems not shown in FIG. 7 including a wide area network such as the Internet, a mouse input device, and/or a scanner. The interconnection via the system bus 702 allows one or more processors 720 to communicate with each subsystem and to control the execution of instructions that may be stored in a system memory 722 and/or the fixed disk 708, as well as the exchange of information between subsystems. The system memory 722 and/or the fixed disk 708 may embody a tangible computer-readable medium.

Embodiments of the invention provide for a number of technical advantages. Embodiments of the invention allow for different machines to conduct access transactions (e.g., payment transactions) with other machines without human intervention. Also, because tokens are used instead of real account credentials, the processing between devices is secure.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components, processes or functions described in this application may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

All references, including publications, patent applications, and patents, cited herein are hereby incorporated by reference to the same extent as if each reference were individually and specifically indicated to be incorporated by reference and/or were set forth in its entirety herein.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications can be made without departing from the scope of the claims below.

For example, although the specific examples described above relate to payment, it is understood that other types of transactions can be conducted and that embodiments of the invention are not limited to payment transactions. For example, a first device may seek to access data on a second device, and may request authorization in a similar manner to that described above with respect to payment transactions.

What is claimed is:

1. A method comprising:
   receiving, at a service provider computer from a user device, a request to provision a machine-to-machine device separate from the user device, the request including a device identifier associated with the machine-to-machine device, the user device having established a first connection with the machine-to-machine device and having established a second connection with the service provider computer, the machine-to-machine device configured to interact with at least one collection device independent of human interaction via a third connection;
   determining, by the service provider computer, based at least in part on the user device, access credentials;
   determining, based on the device identifier, a device type associated with the machine-to-machine device by locating the device type in a device database using the device identifier;
   identifying, by the service provider computer, based at least in part on the access credentials, the device identifier, and a primary function of the machine-to-machine device, the primary function unrelated to communicating with other electronic devices, a policy set relevant to the machine-to-machine device, the policy set indicating a list of transactions that are allowed for the machine-to-machine device based at least in part on the determined device type, certain resource types that are allowed for the machine-to-machine device, and certain merchants with which transactions are allowed to be conducted with the machine-to-machine device;
   determining, by the service provider computer, from the access credentials, at least one access credential to be associated with the device identifier;
   providing, by the service provider computer via the second connection and to the user device, the at least one access credential, the policy set, user account information of a user associated with the user device, and a token generated by encrypting the device identifier and the user account information with an encryption key based on a type of the machine-to-machine device;
   providing, by the user device and via the first connection, the at least one access credential, the token, and the policy set to the machine-to-machine device, the at least one access credential, the user account information, and the policy set being stored on the machine-to-machine device; and
   receiving, by the service provider computer and from the at least one collection device, a transaction request associated with a transaction conducted between the machine-to-machine device and the at least one collection device via the third connection and using the at least one access credential, the transaction being a transaction of the list of transactions included in the policy set.

2. The method of claim 1, further comprising:
   providing from the machine-to-machine device to the at least one collection device, a request to authorize the transaction conducted between the machine-to-machine device and the at least one collection device, the request including the at least one access credential; and
   receiving an authorization response from the at least one collection device.

3. The method of claim 2, wherein the transaction includes a request from the machine-to-machine device for a resource managed by the at least one collection device.

4. The method of claim 1, wherein the second connection between the user device and the service provider computer is established based on determining, by the user device, that the machine-to-machine device is to be provisioned.

5. The method of claim 1, wherein the first connection between the machine-to-machine device and the service provider computer is established based on detecting a network address associated with the device identifier, wherein the at least one access credential is provided to the machine-to-machine device at the network address.

6. The method of claim 1, further comprising:
   receiving an indication that the at least one access credential is no longer valid;
   generating, from the access credentials, a second access credential to be associated with the device identifier; and
   providing the second access credential to the machine-to-machine device.

7. A service provider computer comprising:
   a processor; and
   a memory including instructions that, when executed with the processor, cause the service provider computer to at least:
   receive, from a user device, a request to provision a machine-to-machine device separate from the user device, the request including a device identifier associated with the machine-to-machine device, the user device having established a first connection with the machine-to-machine device and having established a second connection with the service provider computer, the machine-to-machine device configured to interact with at least one collection device independent of human interaction via a third connection;
   determine based at least in part on the user device, access credentials;
   determine, based on the device identifier, a device type associated with the machine-to-machine device by locating the device type in a device database using the device identifier;
   identify based at least in part on the access credentials, the device identifier, and a primary function of the machine-to-machine device, the primary function unrelated to communicating with other electronic devices, a policy set relevant to the machine-to-machine device, the policy set indicating a list of transactions that are allowed for the machine-to-machine device based at least in part on the determined device type, certain resource types that are allowed for the machine-to-machine device, and certain merchants with which the transactions are allowed to be conducted with the machine-to-machine device;

determine from the access credentials, at least one access credential to be associated with the device identifier;

provide, via the second connection and to the user device, the at least one access credential, the policy set, user account information of a user associated with the user device, and a token generated by encrypting the device identifier and the user account information such that the user device is caused to provide, via the first connection, the at least one access credential, the token, and the policy set to the machine-to-machine device, the at least one access credential, the user account information, and the policy set caused to be stored on the machine-to-machine device, an encryption key used in the encrypting based on a type of the machine-to-machine device; and receive a transaction request associated with a transaction conducted between the machine-to-machine device and the at least one collection device via the third connection and using the at least one access credential, the transaction being a transaction of the list of transactions included in the policy set.

* * * * *